(12) United States Patent
Perron

(10) Patent No.: US 9,266,685 B2
(45) Date of Patent: Feb. 23, 2016

(54) CLIP SEPARATING SYSTEM, KIT FOR ASSEMBLING THE SAME, AND CORRESPONDING METHODS OF OPERATING AND ASSEMBLING ASSOCIATED THEREOF

(75) Inventor: David-Bruno Perron, Coaticook (CA)

(73) Assignee: CONCEPTROMEC INC., Magog, Quebec (CA)

( * ) Notice: Subject to any disclaimer, the term of this patent is extended or adjusted under 35 U.S.C. 154(b) by 0 days.

(21) Appl. No.: 14/130,838

(22) PCT Filed: Jul. 5, 2012

(86) PCT No.: PCT/CA2012/050456
§ 371 (c)(1),
(2), (4) Date: Mar. 11, 2014

(87) PCT Pub. No.: WO2013/003959
PCT Pub. Date: Jan. 10, 2013

(65) Prior Publication Data
US 2014/0174886 A1      Jun. 26, 2014

Related U.S. Application Data

(60) Provisional application No. 61/504,429, filed on Jul. 5, 2011.

(51) Int. Cl.
*B65G 47/57* (2006.01)
*B23P 19/04* (2006.01)
(Continued)

(52) U.S. Cl.
CPC ............. *B65G 47/57* (2013.01); *B23P 19/003* (2013.01); *B23P 19/04* (2013.01); *B65G 37/00* (2013.01); *F16B 21/084* (2013.01)

(58) Field of Classification Search
CPC ........ B65G 47/57; B65G 47/14; B65G 47/19; B65G 37/00; F16B 27/00; F16B 21/084; B23P 19/04; B23P 13/003
USPC .......... 198/525, 530, 382, 389; 221/167, 268, 221/270
See application file for complete search history.

(56) References Cited

U.S. PATENT DOCUMENTS 1,445,296 A * 2/1923 Clark ............................ 221/157
3,448,507 A * 6/1969 Nalbantian et al. ............. 29/809
(Continued)

FOREIGN PATENT DOCUMENTS

EP   0 684 194 A1   11/1995
FR   2 764 537 A1   12/1998

OTHER PUBLICATIONS

International Search Report for corresponding International Patent Application No. PCT/CA2012/050456 mailed Sep. 19, 2012.

*Primary Examiner* — Mark A Deuble
(74) *Attorney, Agent, or Firm* — Merchant & Gould P.C.

(57) ABSTRACT

A clip separating system (1) is for separating a clip (3) from an accumulation of clips (3) contained within a feeding assembly (5). The clip separating system (1) includes a separating assembly (7) having an inlet (9) and an outlet (11), the inlet (9) of the separating assembly (7) being operatively connected to an outlet (15) of the feeding assembly (5) for receiving the clip (3) to be separated therefrom. A path (10) is defined between the inlet (9) and the outlet (11) of the separating assembly (7). The clip (3) to be separated is positively driven along the path (10) via a corresponding driving component (19) of the clip separating system (1). The outlet (11) of the separating assembly (7) is vertically offset (21) with respect to the outlet (15) of the feeding assembly.

29 Claims, 25 Drawing Sheets

(51) Int. Cl.
*B23P 19/00* (2006.01)
*B65G 37/00* (2006.01)
*F16B 21/08* (2006.01)

(56) References Cited

U.S. PATENT DOCUMENTS

| | | | |
|---|---|---|---|
| 4,501,380 A * | 2/1985 | Welch | 221/298 |
| 6,138,868 A * | 10/2000 | Yuyama et al. | 221/312 R |
| 6,212,746 B1 * | 4/2001 | Cooks, Jr. | 29/243.56 |
| 6,221,195 B1 * | 4/2001 | Lubert et al. | 156/275.7 |
| 6,254,332 B1 * | 7/2001 | Miura et al. | 414/797.4 |
| 6,257,394 B1 * | 7/2001 | Takahashi et al. | 198/530 |
| 6,283,272 B1 | 9/2001 | Hsieh | |
| 6,435,334 B1 | 8/2002 | Spatafora | |
| 6,568,558 B2 | 5/2003 | Saito et al. | |
| 7,240,782 B2 * | 7/2007 | Weber | 198/396 |
| 7,464,803 B2 | 12/2008 | Cashimere et al. | |
| 2003/0146237 A1 * | 8/2003 | Costa | 221/270 |
| 2006/0138160 A1 | 6/2006 | Iwamoto | |
| 2009/0026040 A1 | 1/2009 | Schmidt | |
| 2009/0255779 A1 * | 10/2009 | Schmidt | 198/383 |

* cited by examiner

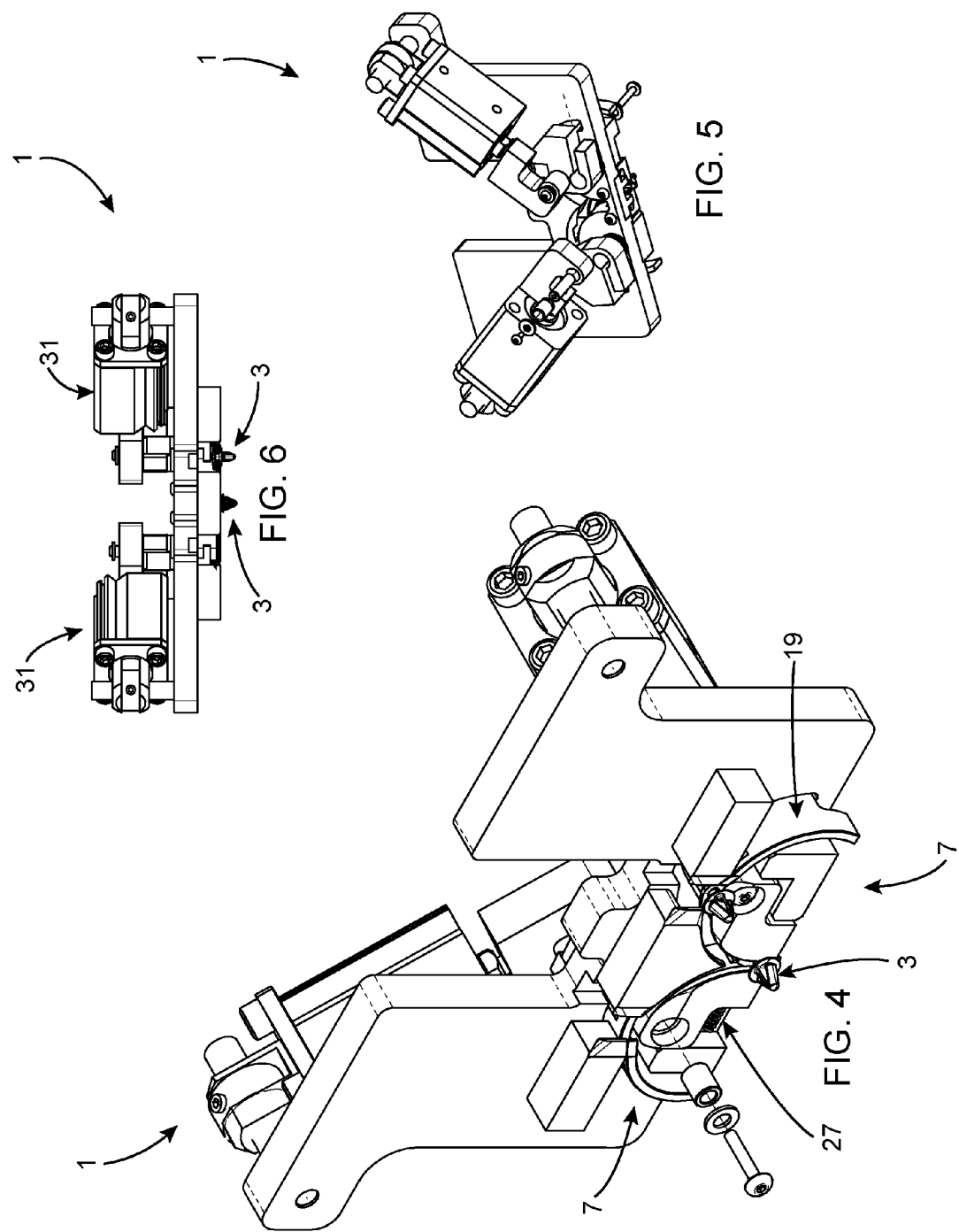

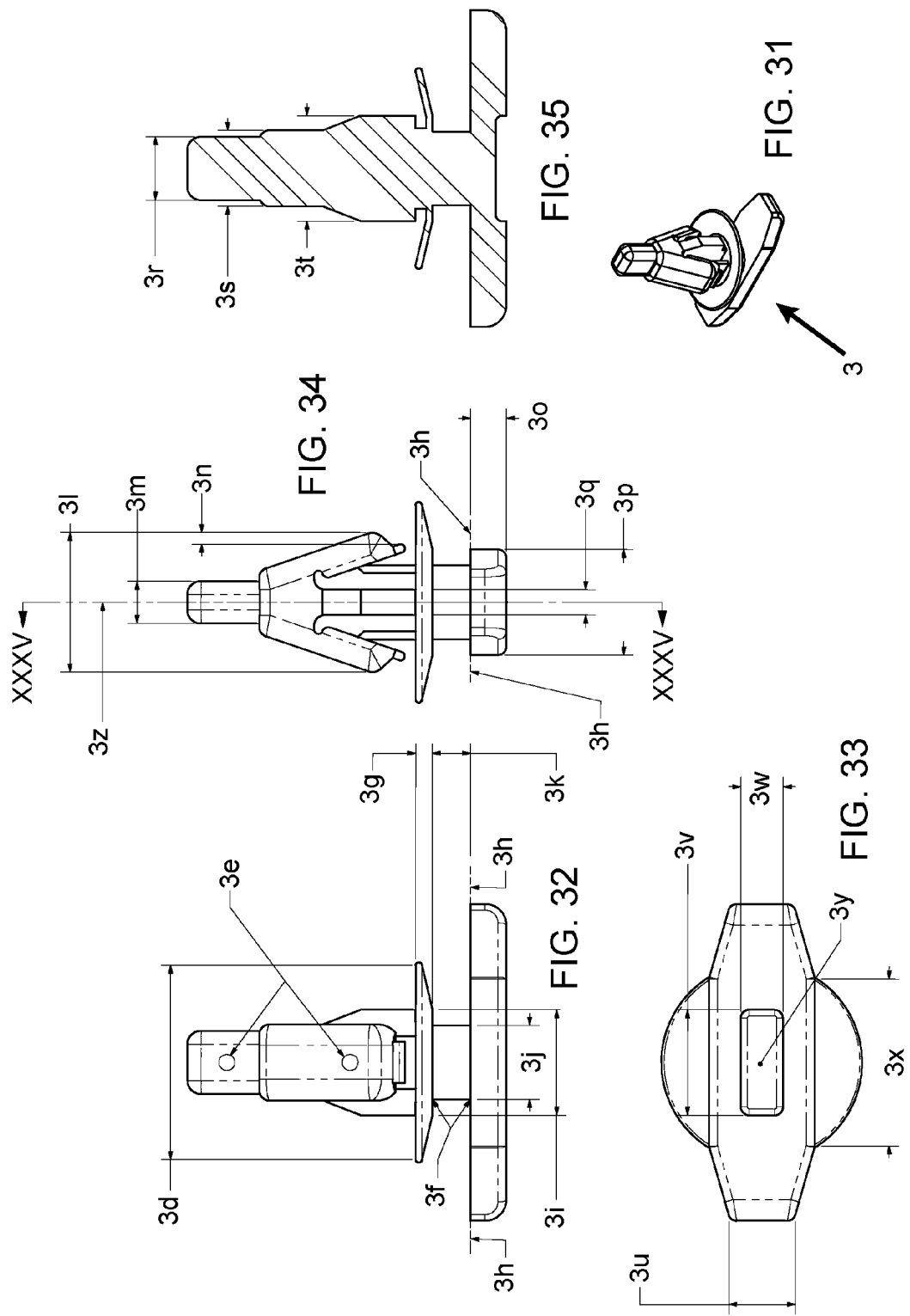

CLIP SEPARATING SYSTEM, KIT FOR ASSEMBLING THE SAME, AND CORRESPONDING METHODS OF OPERATING AND ASSEMBLING ASSOCIATED THEREOF

This application is a National Stage Application of PCT/CA2012/050456, filed 5 Jul. 2012, which claims benefit of Ser. No. 61/504,429, filed 5 Jul. 2011 in the United States and which applications are incorporated herein by reference. To the extent appropriate, a claim of priority is made to each of the above disclosed applications.

FIELD OF THE INVENTION

The present invention relates to a separating system. More particularly, the present invention relates to a clip separating system, to a kit for assembling the same, to a manufacturing plant provided with such a clip separating system, to clips and corresponding products having being processed accordingly, and to corresponding methods of operating and assembling associated thereto.

BACKGROUND OF THE INVENTION

Known in the art are clip separating systems which are typically used in the car industry for individually separating clips from a bulk of accumulated clips so that each clip may be individually picked up by a complementary picking mechanism, and subsequently inserted into a corresponding aperture of a product band, said product band being generally used as a sealing joint in various car portions and the like.

Also known in the art are the various drawbacks and inconveniences associated with such aforementioned conventional systems, namely, but not limited to the following: a) transfer of the clips to be separated is done via a fixed and rigid curved machined component which due to friction and other considerations tends to lead to a jamming of clips and poor feed into the inlet of the separating assembly; b) configuration of a spring-loaded outer moveable component onto an inner fixed component provides for an uneven spring-loaded force throughout the driving path with a greater force felt by the clip at the inlet of the separator which tends to lead to potential obstruction of the clip at the entry point, and weakest force felt by the clip at the outlet of the separator which tends to lead to potential poor positioning and/or securement of the clip prior to being picked up, in addition to requiring an increased driving force necessary to drive the clip from entry to exit of the separator; c) orientation of clips by means of a fixed and rigid curved machined component or rail is not optimal in that a minimal of clips is required in the rail to ensure a proper feed and/or operating of the system to compensate for friction inside the fixed and curved feeding rail; d) a shifting kit is required when a same separator is to be used with two different sources of clips and the shifting action of the shifting kit between the separation action of two different types of clips results in a substantial time delay (i.e. loss of time) that in turn results in a considerable loss of productivity; f) etc.

Hence, in light of the aforementioned, there is a need for an improved system which, by virtue of its design and components, would be able to overcome or at least minimize some of the aforementioned prior art problems.

SUMMARY OF THE INVENTION

The object of the present invention is to provide a clip separating system which satisfies some of the above-mentioned needs and which is thus an improvement over other related clip separating systems and/or methods known in the prior art.

In accordance with the present invention, the above object is achieved, as will be easily understood, with a clip separating system such as the one briefly described herein and such as the one exemplified in the accompanying drawings.

More particularly, according to one aspect of the present invention, there is provided a clip separating system for separating a clip from an accumulation of clips contained within a feeding assembly, the clip separating system comprising:

a separating assembly having an inlet and an outlet, the inlet of the separating assembly being operatively connected to an outlet of the feeding assembly for receiving the clip to be separated therefrom, a path being defined between the inlet and the outlet of the separating assembly, the clip to be separated being positively driven along said path via a corresponding driving component of the clip separating system, the outlet of the separating assembly being vertically offset with respect to the outlet of the feeding assembly.

According to another aspect of the present invention, there is also provided a clip separating system comprising:

a feeding assembly having an inlet and an outlet, the inlet being configured for receiving clips to be separated, and the outlet being configured for dispensing a clip to be separated; and a separating assembly having an inlet and an outlet, the inlet of the separating assembly being operatively connected to the outlet of the feeding assembly for receiving the clip to be separated, a path being defined between the inlet and the outlet of the separating assembly, the clip to be separated being positively driven along said path via a corresponding driving component of the clip separating system, the outlet of the separating assembly being vertically offset with respect to the outlet of the feeding assembly.

According to yet another aspect of the present invention, there is also provided a clip separating system comprising:

first and second feeding assemblies each having an inlet and an outlet, the inlet of each feeding assembly being configured for receiving clips of a certain type to be separated, and the outlet of each feeding assembly being configured for dispensing a given clip of a certain type to be separated; and first and second separating assemblies each having an inlet and an outlet, the inlet of each separating assembly being operatively connected to the outlet of a corresponding feeding assembly for receiving the given clip of a certain type to be separated, a path being defined between the inlet and the outlet of each separating assembly, the given clip of a certain type to be separated being positively driven along a corresponding path via a corresponding driving component of the clip separating system, the outlet of the separating assemblies being common to both separating assemblies and being vertically offset with respect to the outlet of each feeding assembly.

According to another aspect of the present invention, there is provided a manufacturing plant provided with the above-mentioned clip separating system(s) and/or components thereof.

According to another aspect of the present invention, there is provided a method of installing (i.e. assembling) the above-mentioned clip separating system(s), manufacturing plant and/or components thereof.

According to another aspect of the present invention, there is provided a method of operating the above-mentioned clip separating system(s), manufacturing plant and/or components thereof.

More particularly, according to a preferred aspect of the present invention, there is provided a method of separating a clip from a plurality of clips, the method comprising the steps of:

a) accumulating a plurality of clips along a substantially upright path having an inlet and an outlet; and b) separating a bottommost clip from the outlet of the upright path and driving said clip along a substantially curved path to an outlet being vertically offset with respect to the outlet of the vertical path.

According to another preferred aspect of the present invention, there is also provided a method of assembling a clip onto an aperture of band, the method comprising the steps of:

a) separating a clip from an accumulation of clips using the present clip separating assembly;

b) picking up the clip having been separated;

c) displacing the clip towards the band so as to insert a base of the clip into the aperture of the band.

According to another aspect of the present invention, there is provided a kit with corresponding components for assembling the above-mentioned clip separating system(s), manufacturing plant and/or components thereof.

According to yet another aspect of the present invention, there is also provided a method of assembling components of the above-mentioned kit.

According to yet another aspect of the present invention, there is also provided a method of doing business with the above-mentioned kit, clip separating system(s), manufacturing plant and/or components thereof.

According to yet another aspect of the present invention, there is also provided a product (ex. sealing joint, car part, etc.) having been obtained with the above-mentioned kit, clip separating system(s), manufacturing plant and/or corresponding method(s).

The objects, advantages and other features of the present invention will become more apparent upon reading of the following non-restrictive description of preferred embodiments thereof, given for the purpose of exemplification only, with reference to the accompanying drawings.

BRIEF DESCRIPTION OF THE DRAWINGS

FIG. 4 is a front perspective view of some of the components shown in FIG. 1, some of these components being shown in an exploded relationship and others being shown in a partial cut away view to better illustrate a spring assembly acting on a moveable component of one of the separating assemblies.

FIG. 5 is a rear perspective view of what is shown in FIG. 4.

FIG. 6 is a top view of what is shown in FIG. 4, the components that were shown in an exploded relationship being now shown assembled.

FIGS. 31-35 are different views of another example of a clip which may be separated with the present clip separating system.

DETAILED DESCRIPTION OF PREFERRED EMBODIMENTS OF THE INVENTION

Figure 3:
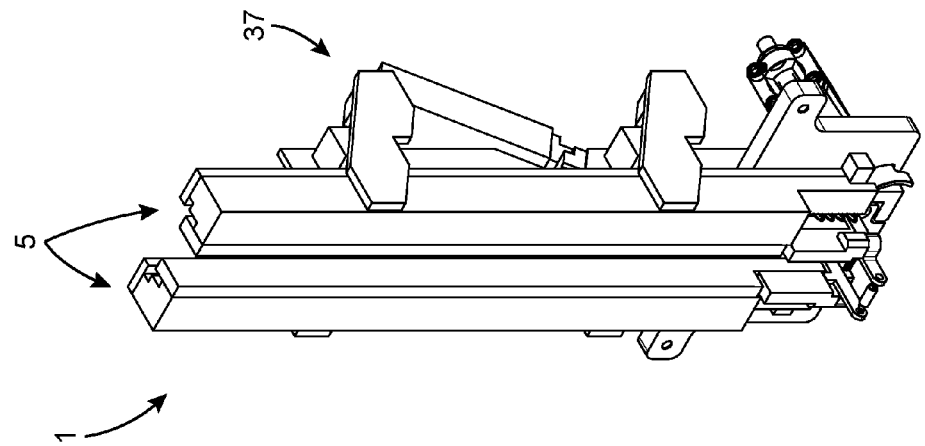
FIG. 3 is a rear perspective view of what is shown in FIG. 1.

In the following description, the same numerical references refer to similar elements. The embodiments, geometrical configurations, materials mentioned and/or dimensions shown in the figures or described in the present description are preferred embodiments only, given for exemplification purposes only.

Moreover, although the present invention was primarily designed for assembling clips onto components destined for the car manufacturing industry, it may be used with other types of objects and/or applications, and in other fields, as apparent to a person skilled in the art. For this reason, expressions such as "assembling", "clip", "car", "seal", "joint", "manufacturing", etc., used herein should not be taken as to limit the scope of the present invention and includes all other kinds of objects or fields with which the present invention could be used and may be useful.

Moreover, in the context of the present invention, the expressions "system", "separator", "kit", "plant", "device", "assembly" and "unit", as well as any other equivalent expressions and/or compounds word thereof known in the art will be used interchangeably, as apparent to a person skilled in the art. This applies also for any other mutually equivalent expressions, such as, for example: a) "clip", "attachment", "fastener", "connector", "joint", "seal", etc.; b) "path", "rail", "channel", "guide", "track", "conduit", "course", "travel", etc.; c) "joint", "seal", "band", "product", "rubber", etc.; d) "rotating", "driving", "displacing", "moving", "supporting", "gliding", "conveying", "pushing", "positioning", etc.; e) "component", "jaw", "lamella", "clamp", etc.; f) "cylinder", "actuator", "servo", "motor", "control", etc.; g) "fastening", "securing", "attaching", "anchoring", "adjusting", "positioning", "inserting", etc.; h) "hole", "bore", "slot", "slit", "cavity", "aperture", "socket", etc.; i) "rotating", "pivoting", "turning", "rolling", etc.; j) "inner", "proximate", etc.; k) "outer", "distal", etc.; l) "inlet", "feed", "entry point", "entry passage", "entry port", etc., m) "outlet", "output", "exit point", "exit passage", "exit port", etc.; n) "positively, "forcefully", "pro-actively", etc; o) "drive", "control", "urge", "position", etc.; p) "processed", "manufactured", "assembled", etc.; q) "vertical", "upright", "non-horizontal", etc.; as well as for any other mutually equivalent expressions, pertaining to the aforementioned expressions and/or to any other structural and/or functional aspects of the present invention, as also apparent to a person skilled in the art.

Furthermore, in the context of the present description, it will be considered that expressions such as "inserted" and "insertable", or "connected" and "connectable", or "mounted" and "mountable", may be interchangeable, in that the present invention also relates to a kit with corresponding components for assembling a resulting fully assembled clip separating system (1).

In addition, although the preferred embodiment of the present invention as illustrated in the accompanying drawings may comprise various components, and although the preferred embodiment of the clip separating system (1) as shown consists of certain geometrical configurations as explained and illustrated herein, not all of these components and geometries are essential to the invention and thus should not be taken in their restrictive sense, i.e. should not be taken as to limit the scope of the present invention. It is to be understood, as also apparent to a person skilled in the art, that other suitable components and cooperation thereinbetween, as well as other suitable geometrical configurations may be used for the clip separating system (1) and corresponding components according to the present invention, as will be briefly explained hereinafter and as can be easily inferred herefrom by a person skilled in the art, without departing from the scope of the invention.

Broadly described, the present invention, as illustrated in the accompanying drawings, relates to a clip separating system (1) to be used for separating clips (3) intended to be individually picked up and subsequently inserted onto components (ex. seals, bands, products, parts, etc.) destined primarily for the manufacturing industry (ex. car industry, etc.). The present clip separating system (1) is preferably of simple design and inexpensive to manufacture or assemble. As will be shown hereinbelow, the present clip separating system (1) possesses several advantages when compared to conventional clip separating systems known in the art.

Figure 2:
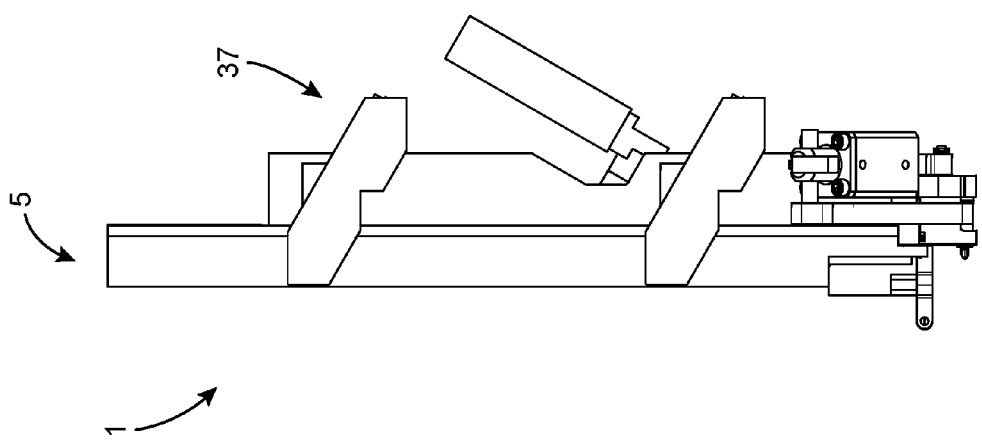
FIG. 2 is a side elevational view of what is shown in FIG. 1.
Figure 1:
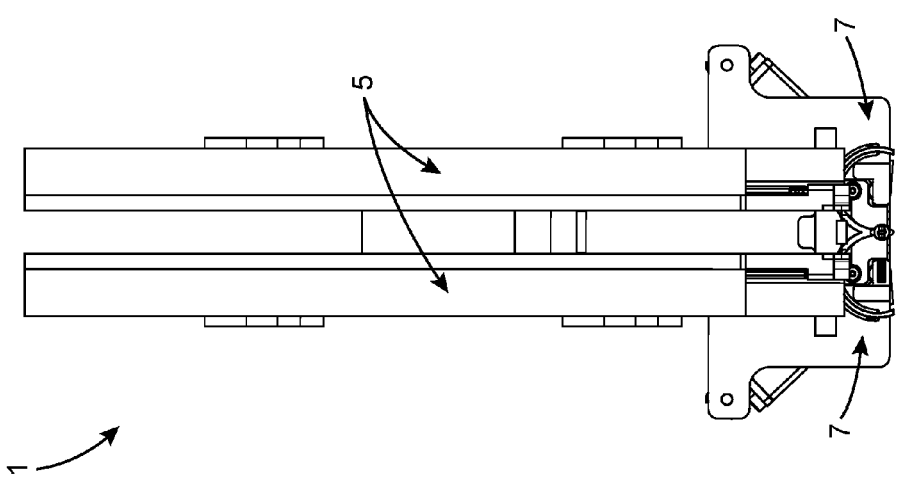
FIG. 1 is a front elevational view of a clip separating system according to a preferred embodiment of the present invention.
Figure 7:
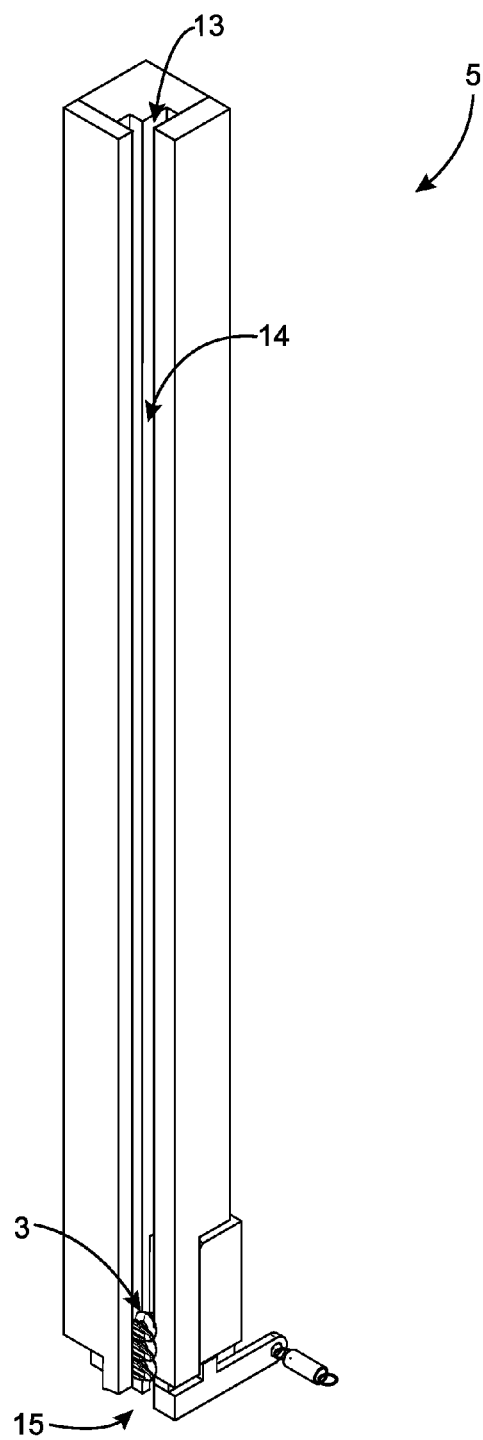
FIG. 7 is a rear perspective view of a feeding rail and other associated components of a clip separating system according to a preferred embodiment of the present invention.
Figure 8:
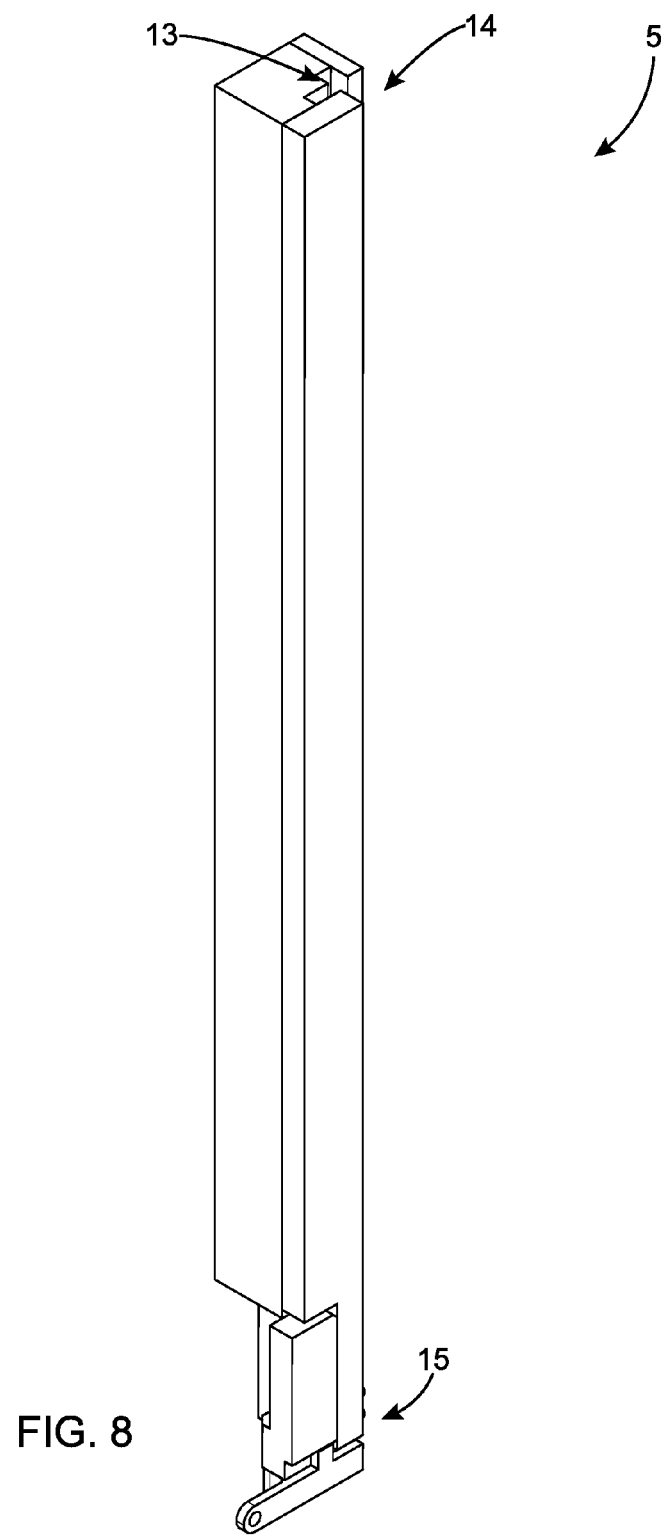
FIG. 8 is a front perspective view of some of the components shown in FIG. 7.
Figure 9:
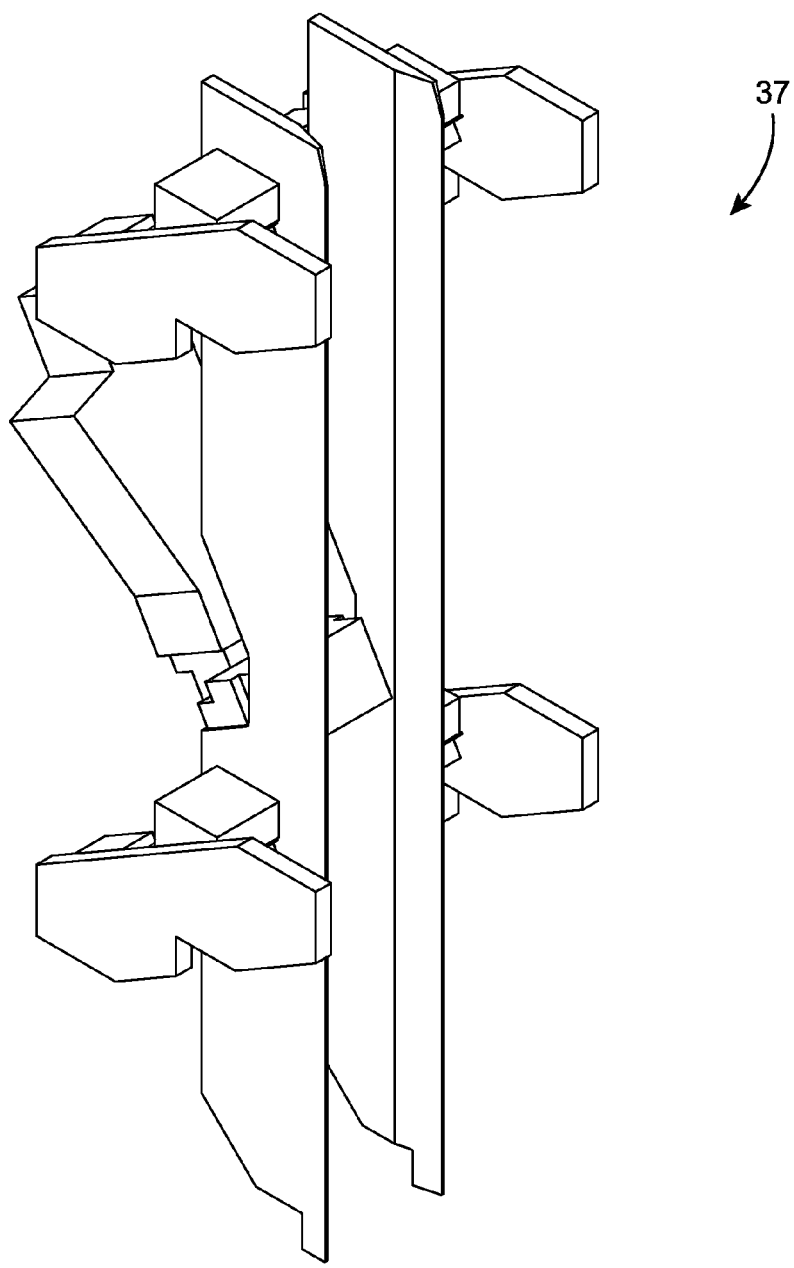
FIG. 9 is a front perspective view of the vibration assembly shown in FIG. 3.
Figure 10:
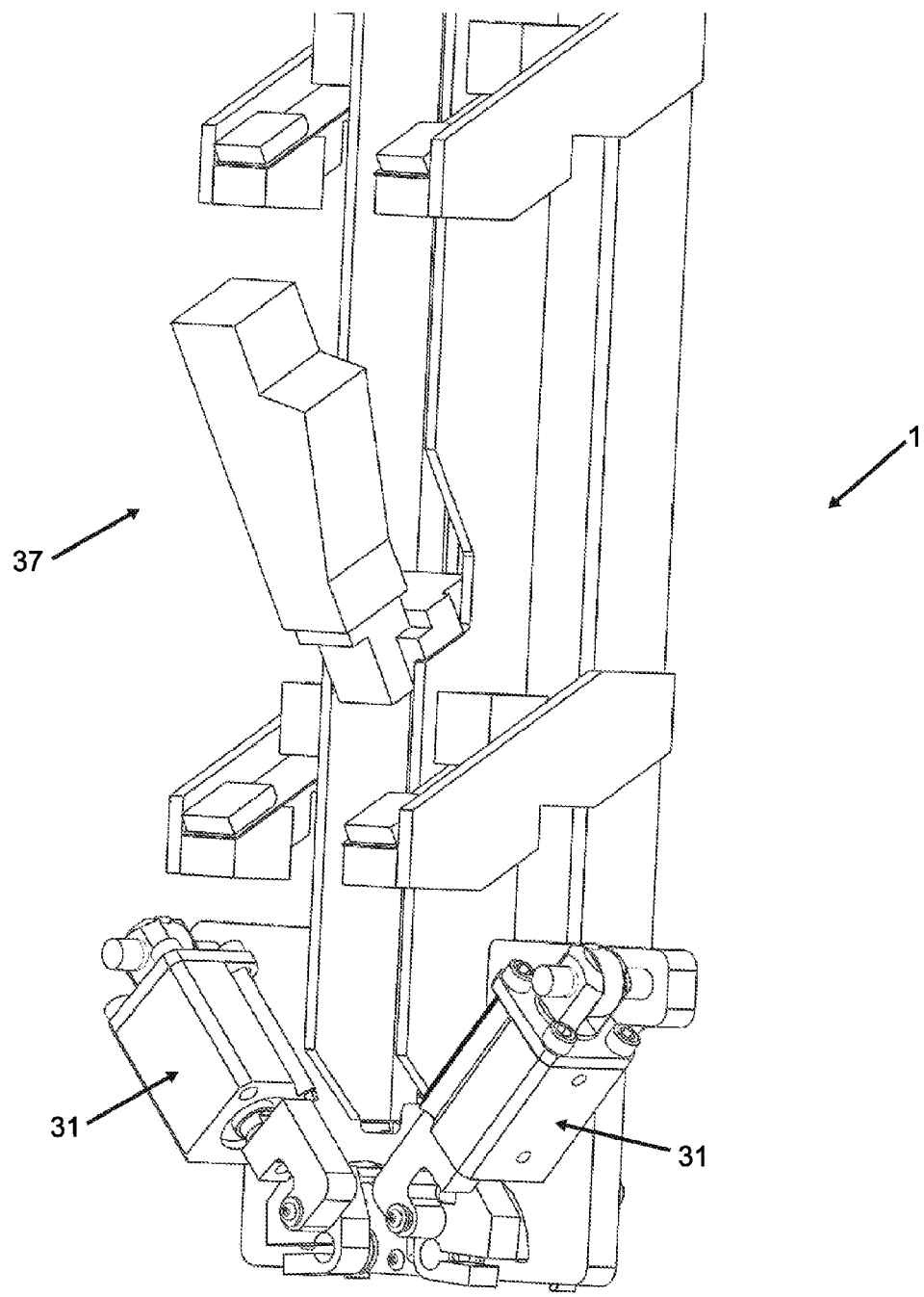
FIG. 10 is a rear perspective view of a portion of what is shown in FIG. 3.
Figure 11:
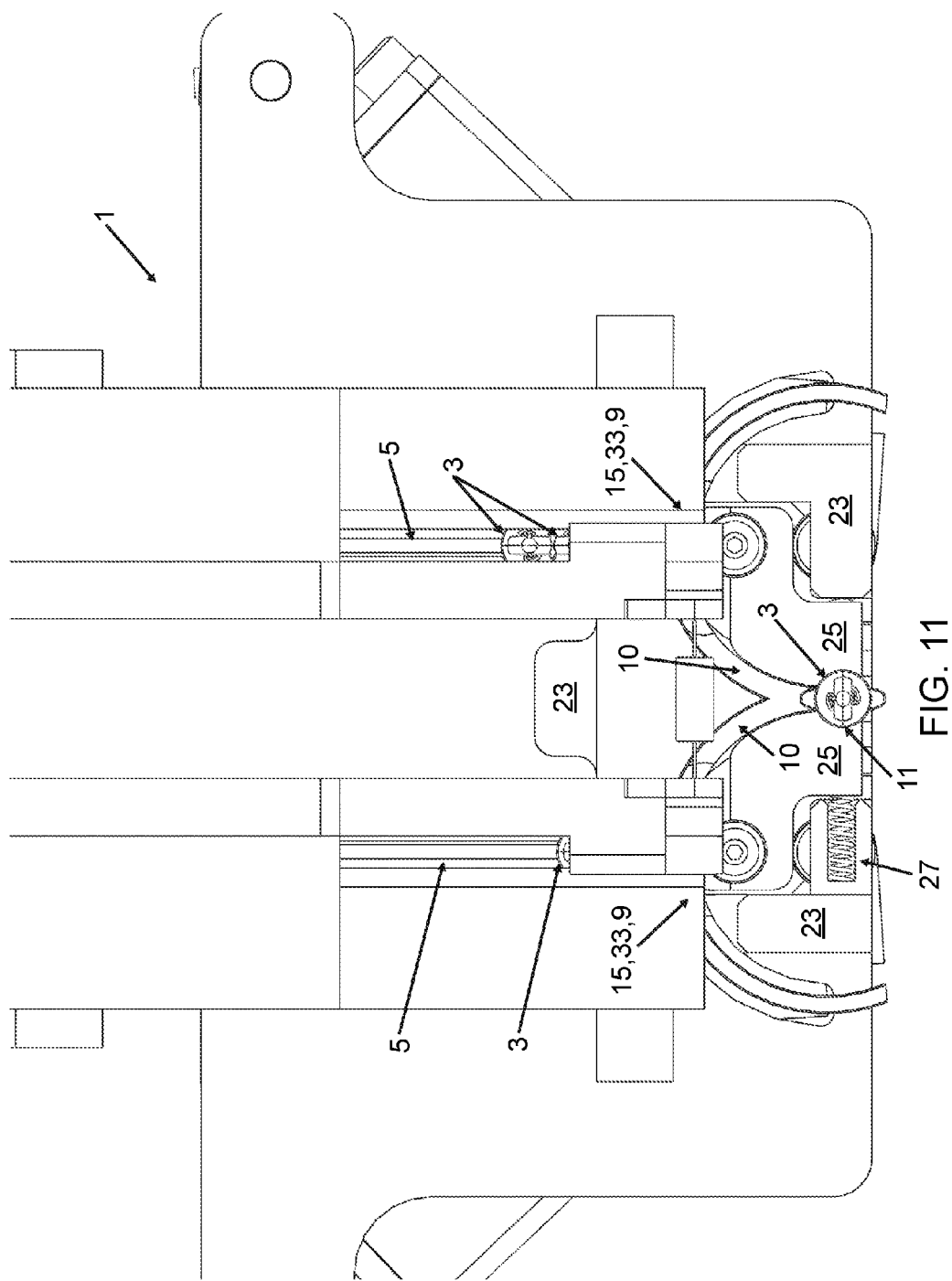
FIG. 11 is an enlarged view of a portion of what is shown in FIG. 1.
Figure 12:
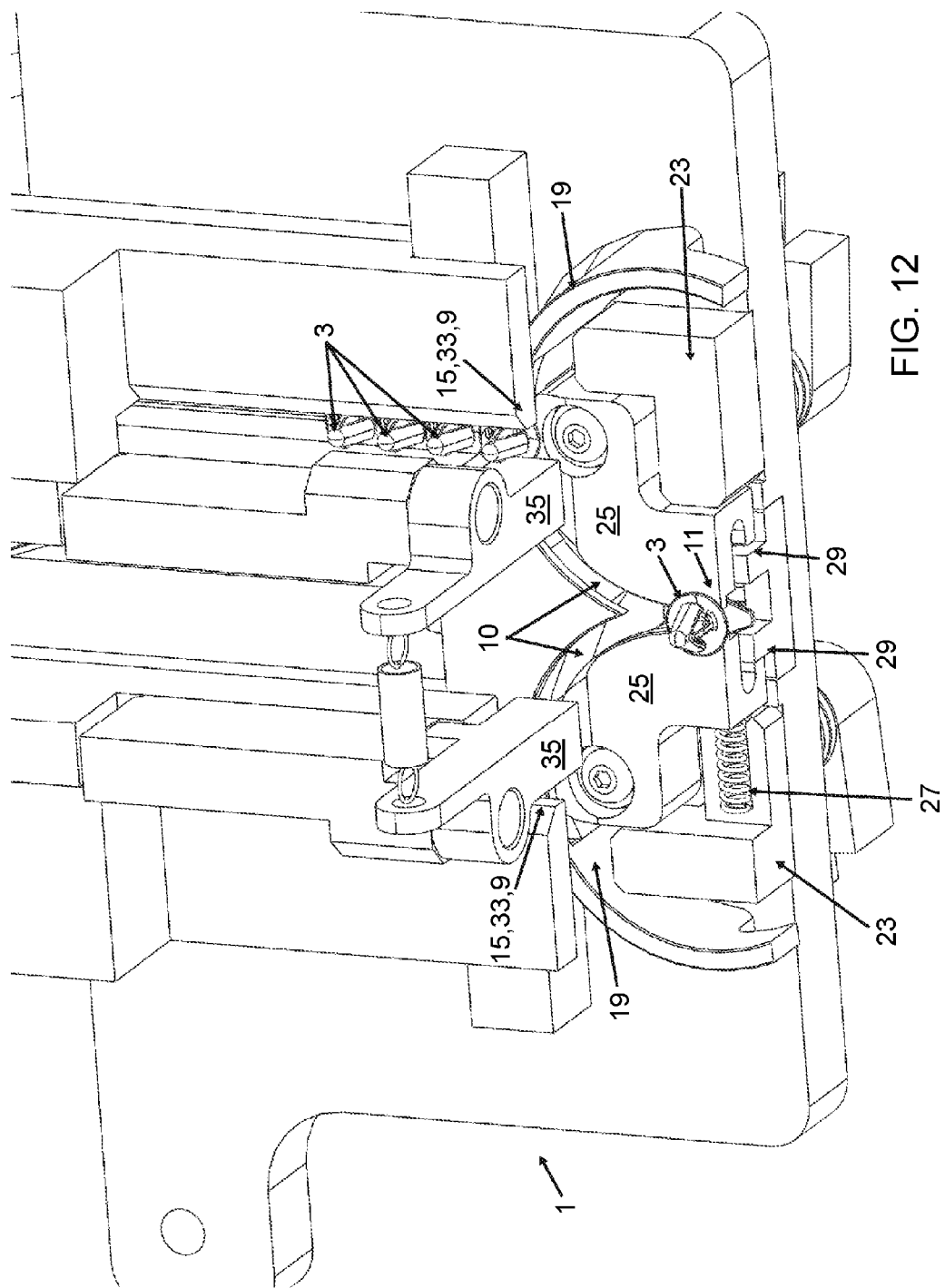
FIG. 12 is a perspective view of what is shown in FIG. 11.
Figure 13:
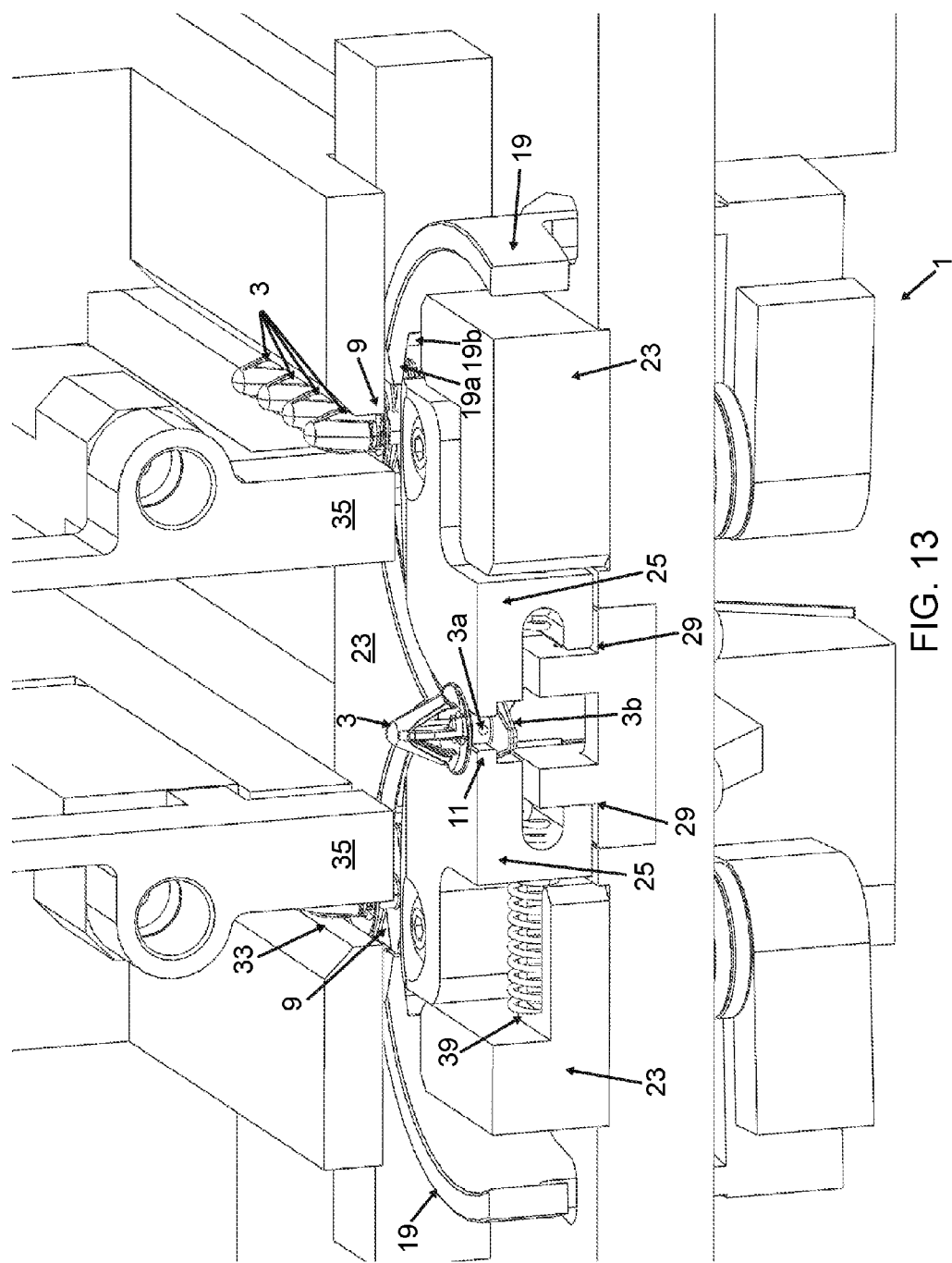
FIG. 13 is a bottom perspective view of a portion of what is shown in FIG. 12.
Figure 14:
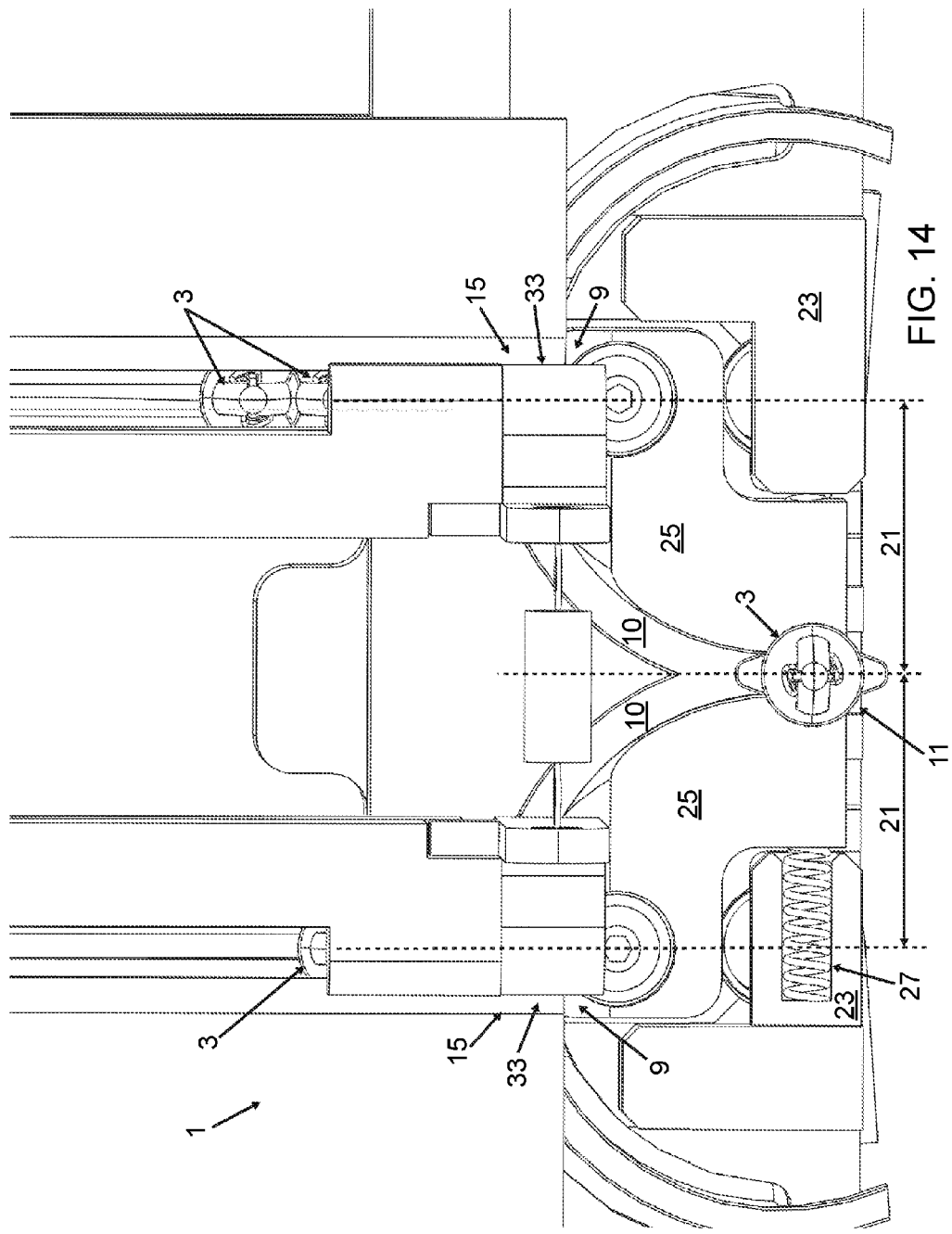
FIG. 14 is an enlarged view of a portion of what is shown in FIG. 11.
Figure 15:
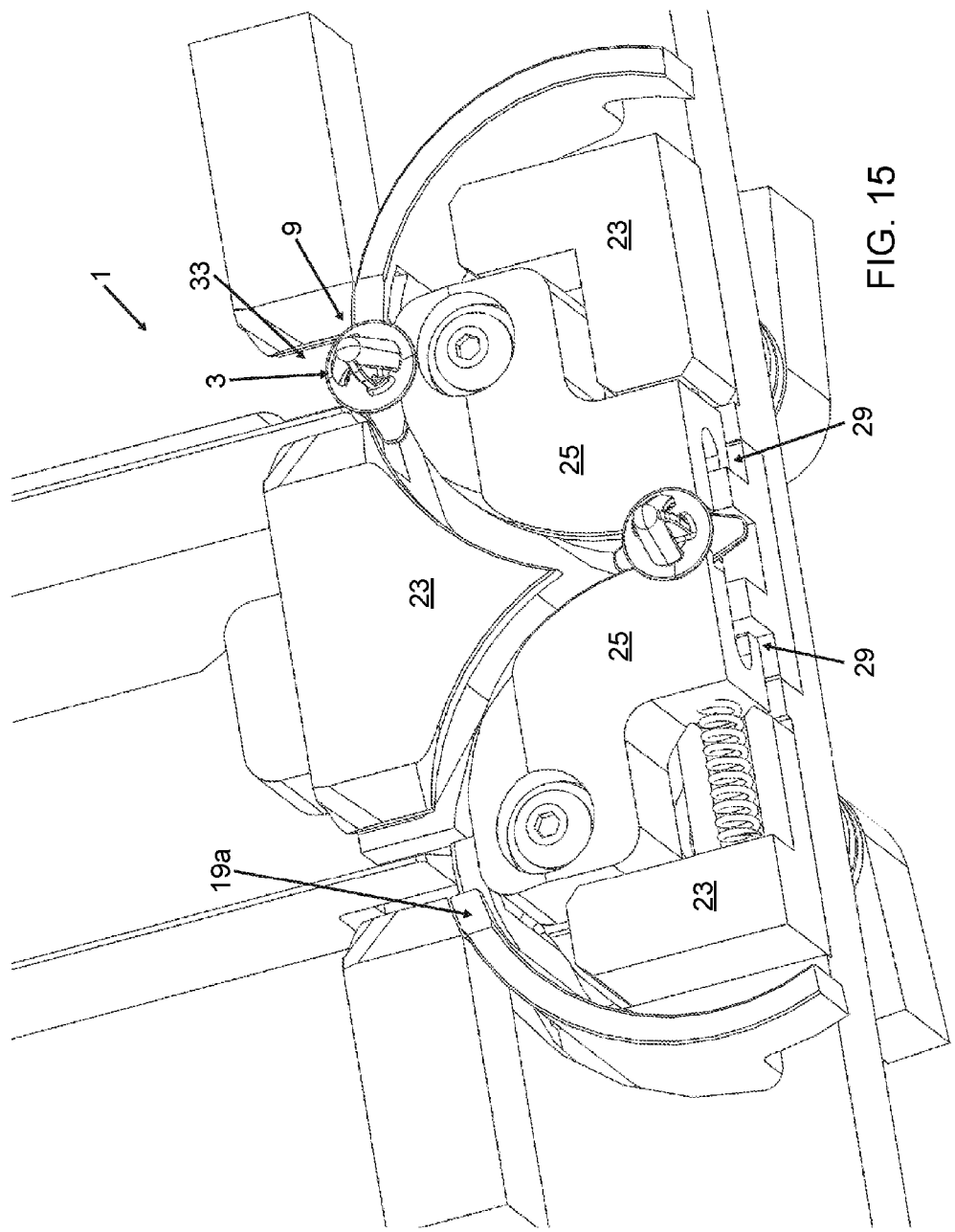
FIG. 15 is another perspective view of what is shown in FIG. 12, some of the components having been removed to better illustrate the separating assemblies of the clip separating system.

More particularly, as can be easily understood by a person skilled in the art when referring to FIGS. 1-15, and according to a preferred aspect of the present invention, there is provided a clip separating system (1) for separating a clip (3) from an accumulation of clips (3) contained within a feeding assembly (5), the clip separating system (1) comprising a separating assembly (7) having an inlet (9) and outlet (11), the inlet (9) of the separating assembly (5) being operatively connected to an outlet (15) of the feeding assembly (5) for receiving the clip (3) to be separated therefrom, a path (10) being defined between the inlet (9) and the outlet (11) of the separating assembly (7), the clip (3) to be separated being positively driven along said path (10) via a corresponding driving component (19) of the clip separating system (1), the outlet (11) of the separating assembly (7) being vertically offset (21) with respect to the outlet (15) of the feeding assembly (7), as may be better appreciated when referring to FIGS. 11-15, for example. Namely, the outlet (15) of the feeding assembly (7) (and/or corresponding inlet (9) of the separating assembly (7)) is disposed along a different plane than that of the outlet (11) of the separating assembly (7) (and/or corresponding pick up location of the clip (3) by the complementary pick up mechanism). As can be easily understood, any suitable complementary pick up and insertion tool known in the art may be used in combination with the present clip separating system (1).

According to a preferred embodiment of the invention, the path (10) is defined between a fixed component (23) and a moveable component (25) of the clip separating system (1), the moveable component (25) being positioned inwardly with respect to the fixed component (23), and the moveable component (25) having a portion located under the outlet (15) of the feeding assembly (5), as also better shown in FIGS. 11-15, for example. Preferably, and as also shown, the path (10) of the separating assembly (7) is a substantially arched path, and preferably, about one quarter of a circle, although various other suitable geometric configurations may be used depending on the particular applications for which the present clip separating system (1) is intended for, and the desired end results, as can be easily understood by a person skilled in the art.

According to another preferred embodiment of the invention, the moveable component (25) is biased towards the fixed component (23), and although various types of biasing forces or configurations may be used for the present system (1), the moveable component (25) is preferably spring-loaded towards the fixed component (23), by means of a spring assembly (27) providing a corresponding biasing force, so as to precisely clamp and maintain the clip (3) to be separated in place at the end of the path (10), as can be easily understood by a person skilled in the art when referring to the accompanying drawings.

Figure 16:
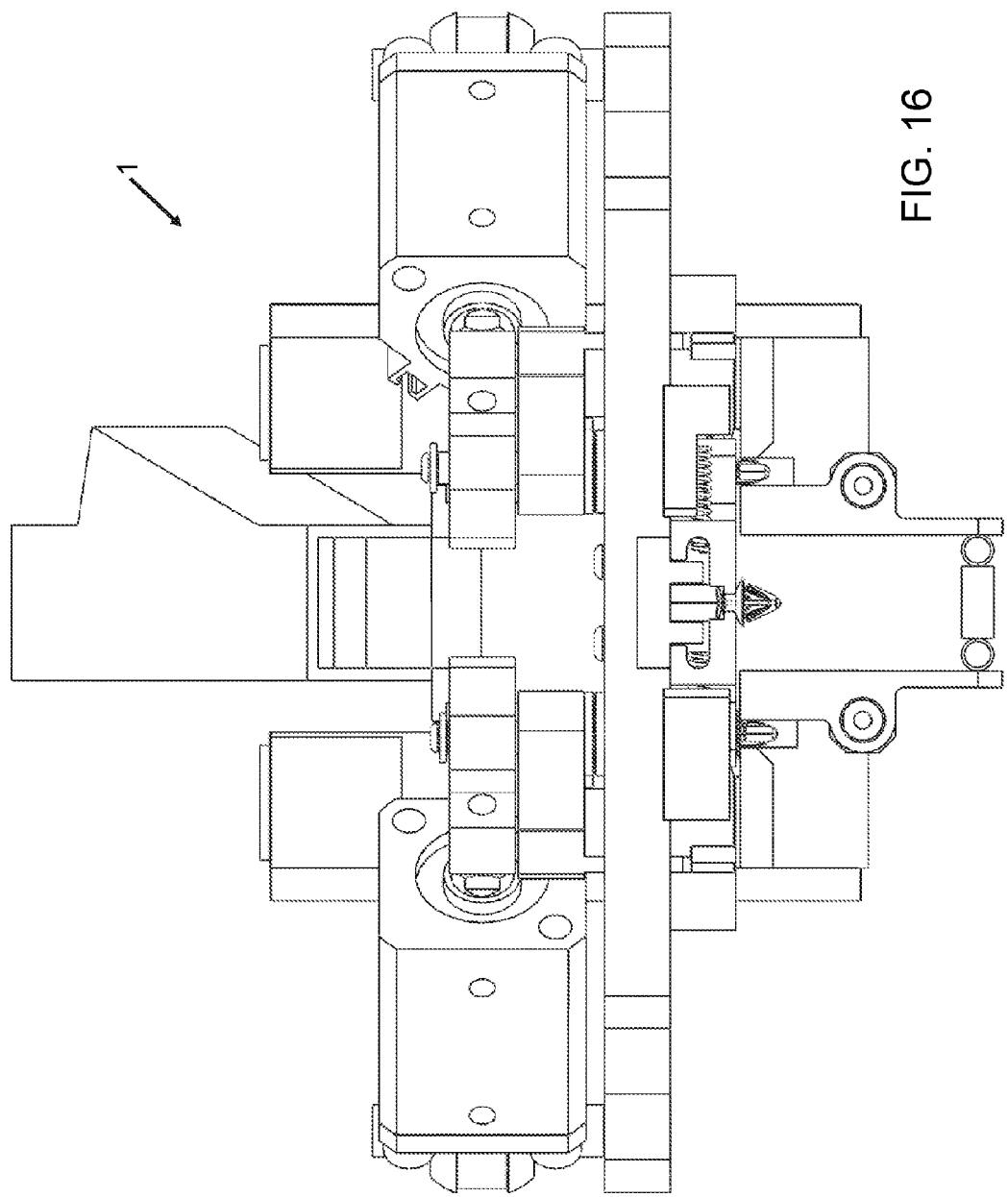
FIG. 16 is a bottom view of what is shown in FIG. 10.
Figure 17:
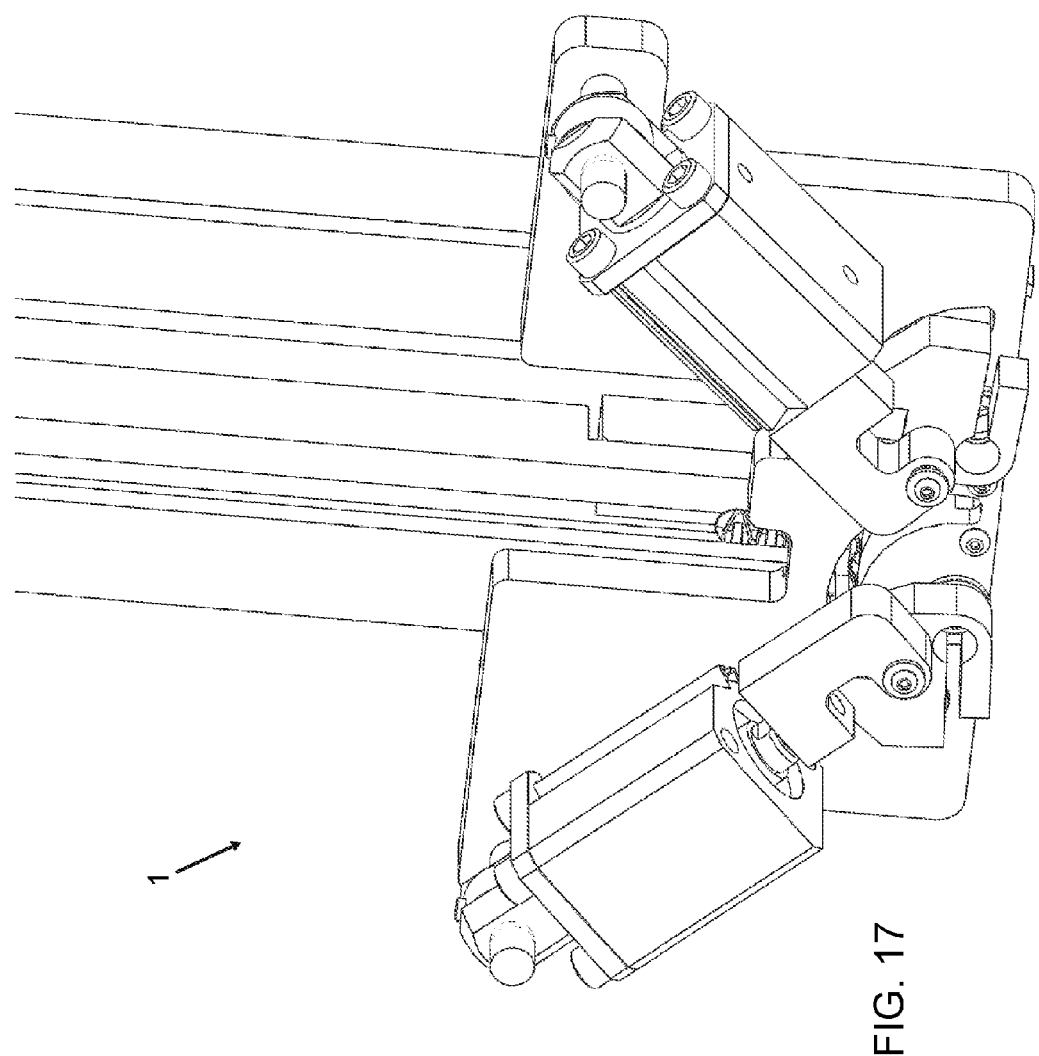
FIG. 17 is a rear perspective view of some of the components shown in FIG. 10.
Figure 18:
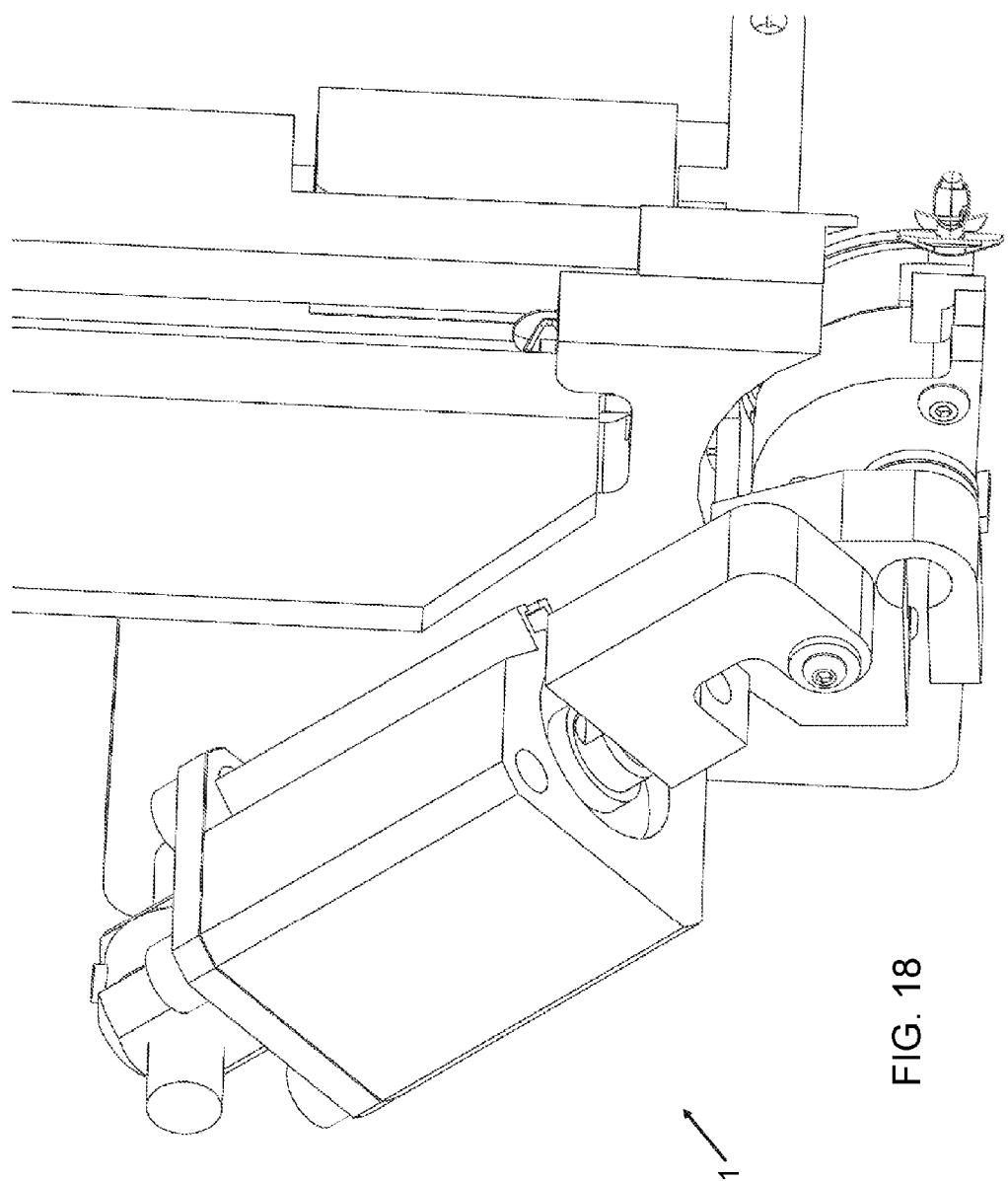
FIG. 18 is an enlarged view of a portion of what is shown in FIG. 17 taken along a longitudinal cross-sectional plane.
Figure 19:
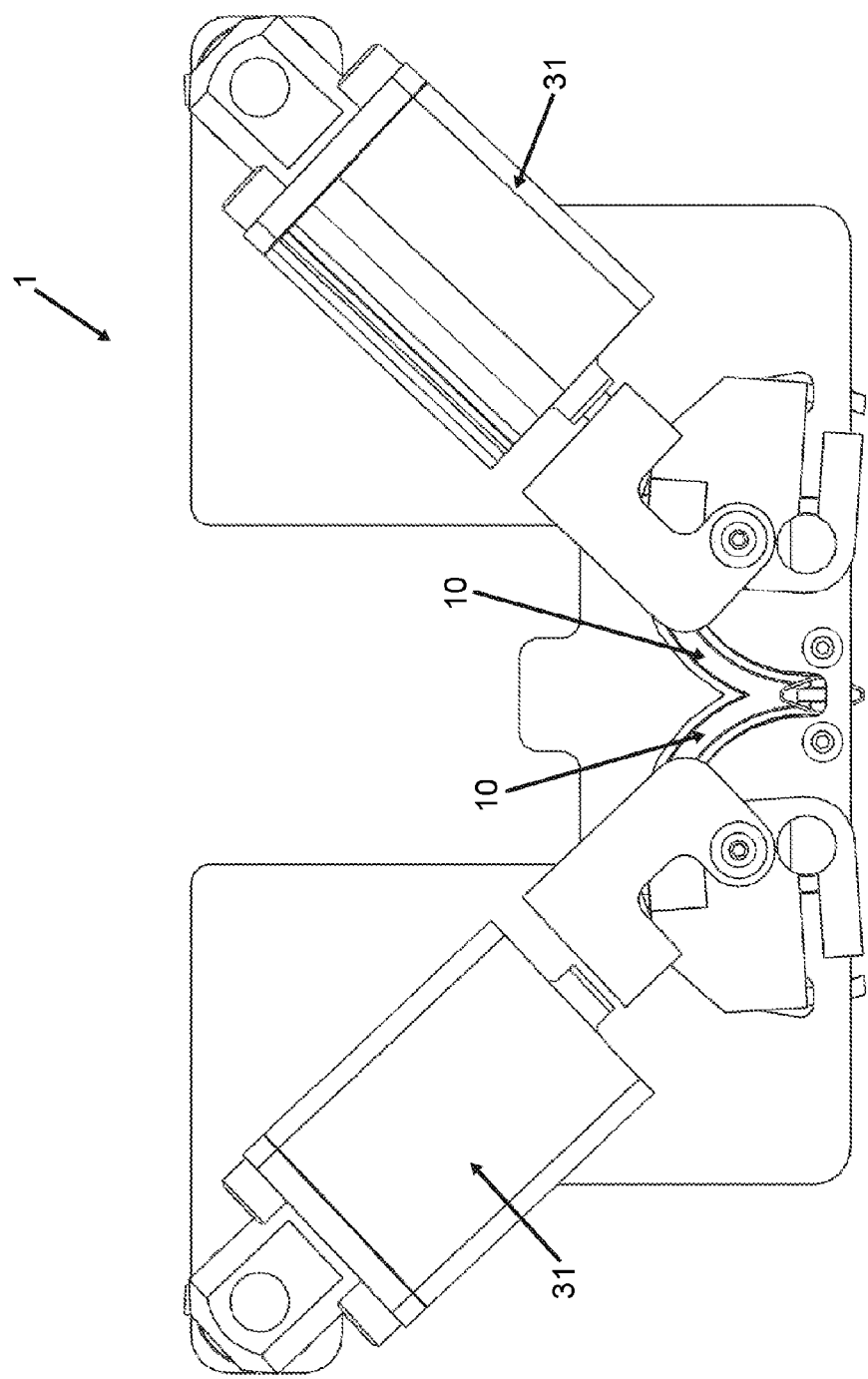
FIG. 19 is a rear view of some of the components shown in FIG. 17.
Figure 20:
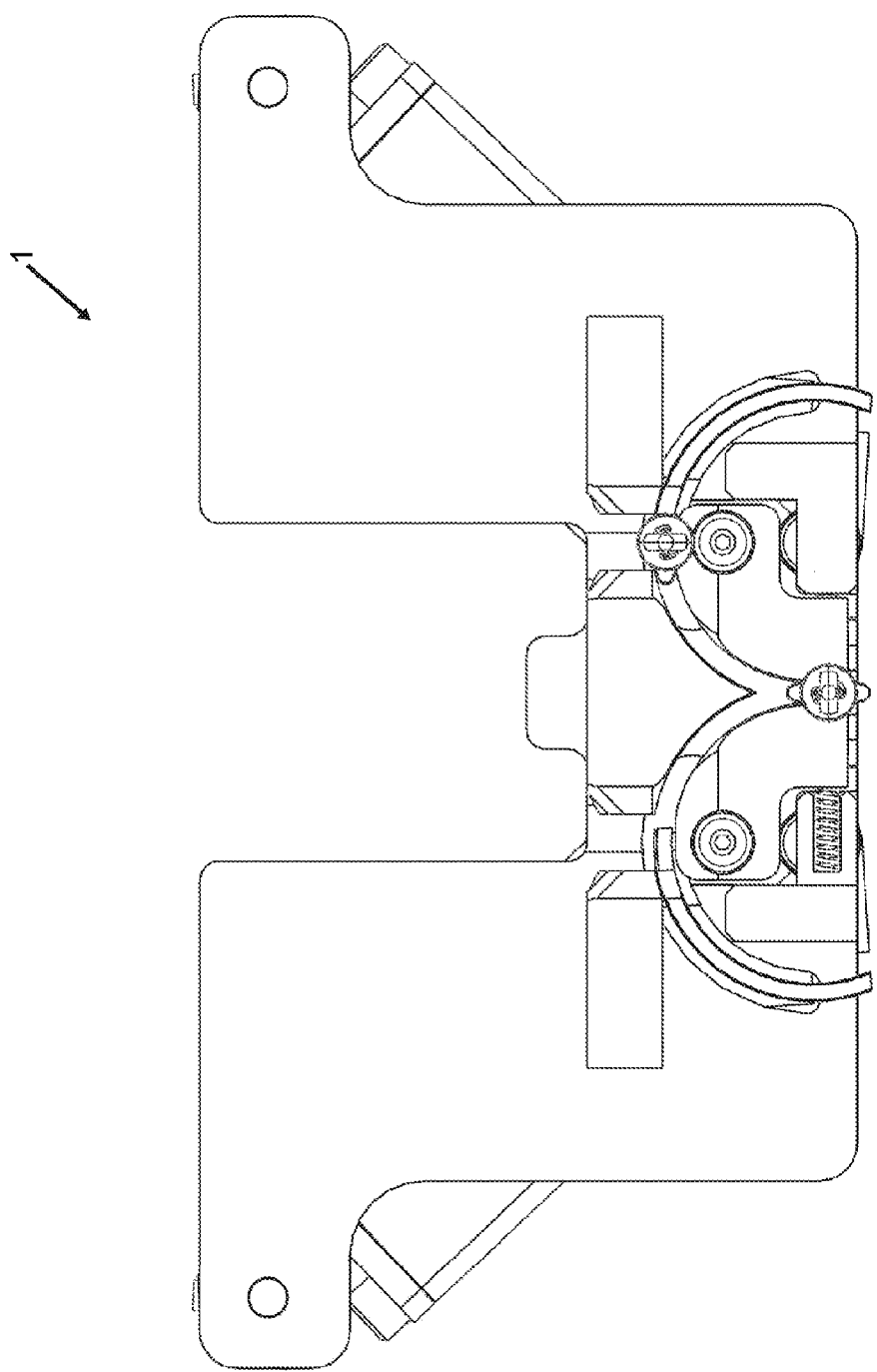
FIG. 20 is a front view of what is shown in FIG. 19.
Figure 21:
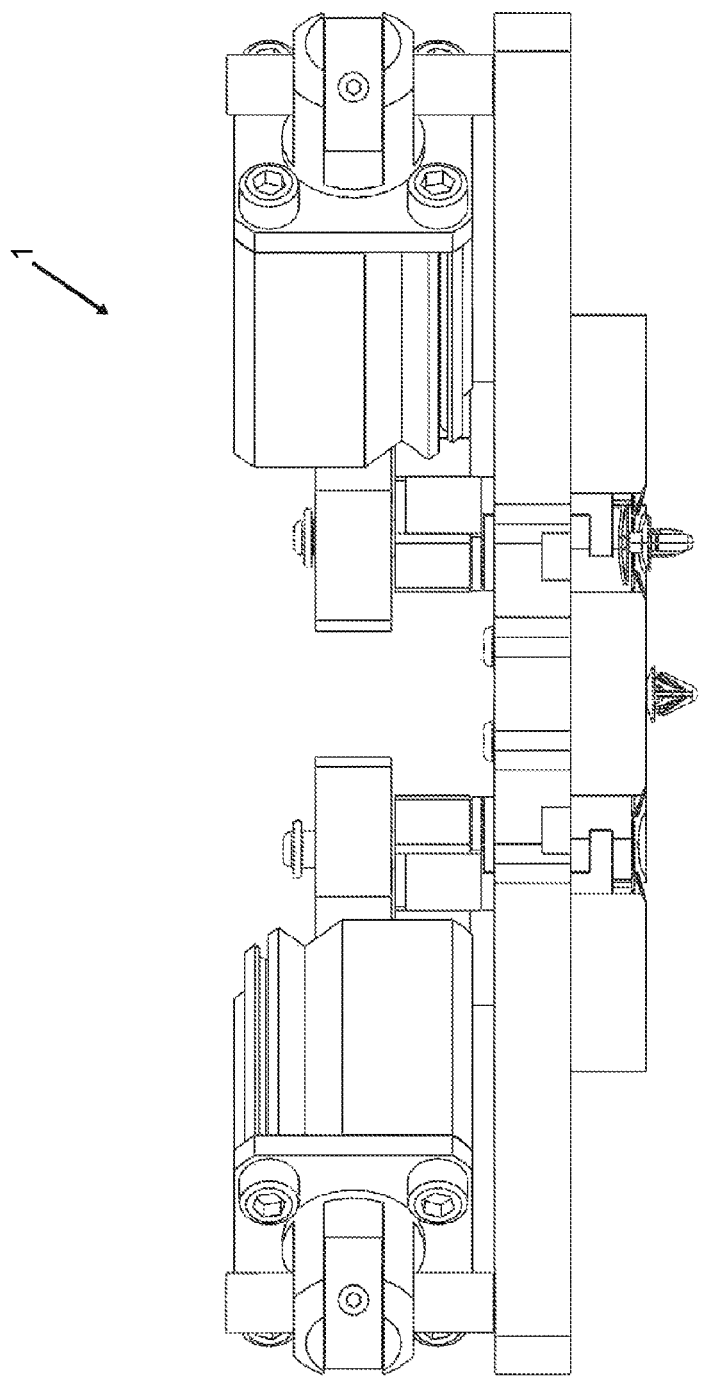
FIG. 21 is a top view of what is shown in FIG. 20.
Figure 22:
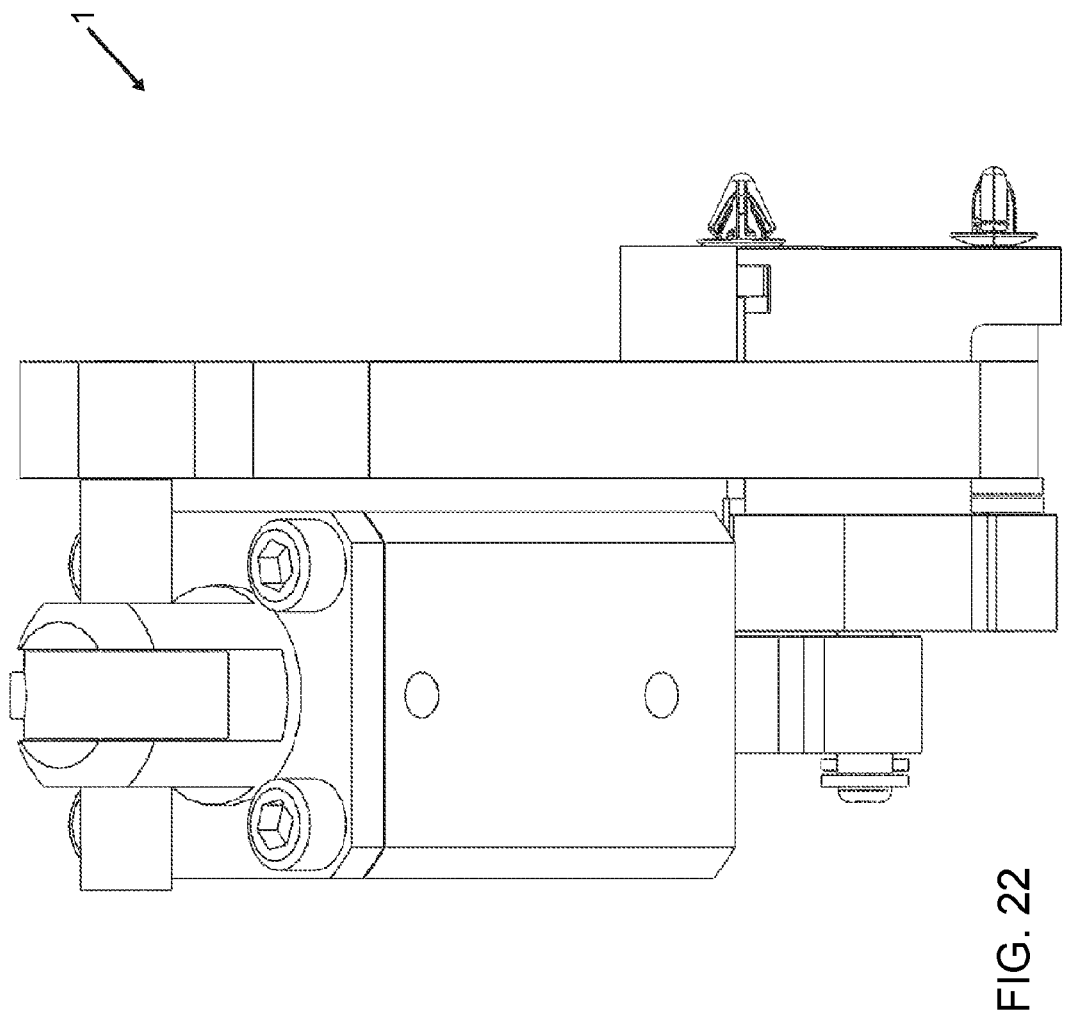
FIG. 22 is a side view of what is shown in FIG. 19.
Figure 23:
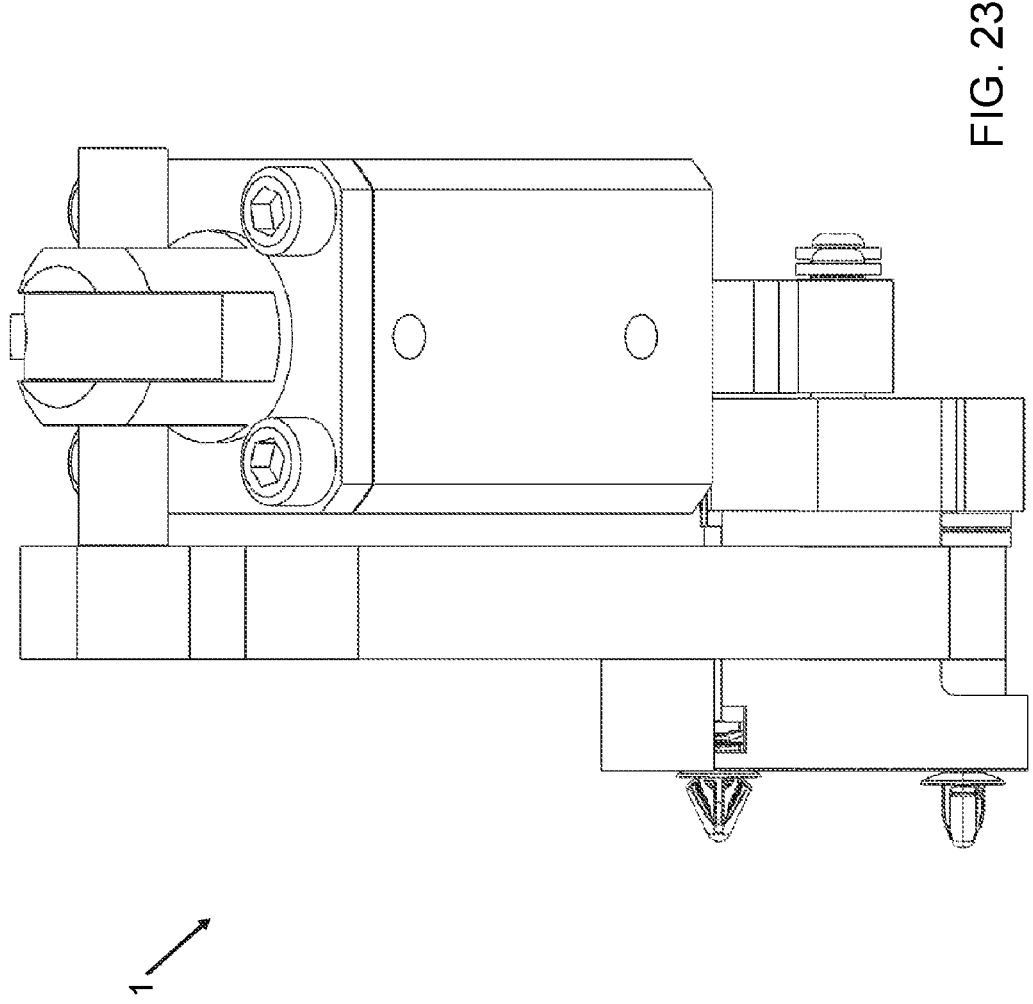
FIG. 23 is another side view of what is shown in FIG. 19.

Preferably, the moveable component (25) is positioned, shaped and sized with respect to the fixed component (23) so that the biasing force acting on the clip (3) being separated increases as the clip (3) is displaced along the path (10) from the inlet (9) to the outlet (11) of the separating assembly (7). Preferably also, the moveable component (25) is further positioned, shaped and sized with respect to the fixed component (23) so that the clip (3) is deprived of any biasing force when entering the inlet (9) of the separating assembly (7). These preferred features of the system are particularly advantageous in that they enable the clip (3) to be separated to be precisely positioned at the inlet (9) of the separating assembly (7) via a geometrical disposition of the inlet (9) and neighboring components, without the adverse effects of a biasing force at this entry point of the system (1), while advantageous using the biasing force progressively increasing as the clip (3) is urged along the path (10) for ensuring that the spring-loaded force acting between the fixed and moveable components (23, 25) will securely clamp and maintain the clip (3) into place, at the end of travel of the driving component (19), when the latter is drawn back to an original position for separating a subsequent clip (3) from the feeding assembly (5), as can also be easily understood by a person skilled in the art when referring to FIGS. 1-23.

According to a preferred embodiment of the present invention, the biasing force of the system (1) may also comprise a preload being selectively adjustable by means of a corresponding adjustment component (39) (ex. setscrew) of the clip separating system (1). It is worth mentioning also that other suitable components, features and/or configurations may be used for providing the present system (1) with a suitable preload or adjustment value to the biasing force as a default level, etc.

According to another preferred embodiment of the present invention, and as can be easily understood by a person skilled in the art when referring to FIGS. 1-15, the clip separating system (1) comprises a transitional area (33) operatively interconnecting the outlet (15) of the feeding assembly (5) to the inlet (9) of the separating assembly (7). Preferably, the transitional area (33) is positioned, shaped and sized for allowing no more than two clips (3) to be accumulated in the transitional area (33) when a clip (3) to be separated is present in the inlet (9) of the separating assembly (7). This is particularly advantageous in that such a configuration of the transitional area (33) is intended to avoid or minimize jamming of clips (3) inside the transitional area (33).

As better shown in FIGS. 4, 11-15 and 20, and according to yet another preferred embodiment of the present invention, the driving component (19) of the clip separating system (1) preferably comprises a pushing component (19a) for pushing onto a midsection (3a) (ex. neck) of the clip (3) to be separated along the path (10) during a driving stroke of the driving component (19), and preferably also further comprises a supporting component (19b) for supporting a bottom section (3b) of the clip (3) to be separated along the path (10) during a driving stroke of the driving component (19).

Preferably also, the transitional area (33) is further positioned, shaped and sized with respect to a component of the driving component (19) so that accumulated clips (3) in the transitional area (33) shift downwardly by about half of a position for each driving stroke of the driving component (19), and so that accumulated clips (3) in the transitional area (33) further shift downwardly by about half of a position for each retracting stroke of the driving component (19), as can be easily understood by a person skilled in the art when referring to FIGS. 11-15.

According to a preferred embodiment of the present invention, the driving component (19) is operatively activated by means of a driving cylinder (31), such as a pneumatic cylinder (31) for example, although other suitable types of actuators and/or controls may be used, as apparent to a person skilled in the art.

As also better shown in FIGS. 11-14, and according to yet another preferred embodiment of the present invention, the clip separating system (1) comprises a fingerstop (35) intersecting the path (10) of the separating assembly (7) and being proximate to the inlet (9) thereof, the fingerstop (35) being positioned, shaped and sized for allowing the insertion/drop of one clip (3) to be separated at a time into the inlet (9) of the separating assembly (7). Preferably also, the fingerstop (35) is rotatably mounted onto the clip separating system (1) and spring-loaded so as to allow passage of the clip (3) through the fingerstop (35) along a single direction corresponding to a driving stroke of the driving component (19) of the clip separating system (1).

According to yet another preferred embodiment of the present invention, the clip separating system (1) or clip separating "assembly" comprises a positioning abutment component (29) for abutting against the moveable component (25) to ensure a minimal distance between the moveable component (25) and the fixed component (23) of the separating assembly, and preferably also, the positioning abutment component (29) is configured to be selectively adjustable within the separating assembly so as to adjustably vary a default minimum distance of passage at the outlet (11) of the separating assembly (7).

According to the present invention, the clip separating system (1) also preferably comprises its own feeding assembly (5) having an inlet (13) and an outlet (15), the inlet (13) being configured for receiving clips (3) to be separated from a corresponding source (feeding hooper, vibrating bowl, etc.), and the outlet (15) being configured for dispensing a clip (3) to be separated towards the inlet (9) of the separating assembly (7). A path (14) is preferably defined between the inlet (13) and the outlet (15) of the feeding assembly (5), such feeding path (14) being configured for accumulating a plurality of clips (3) to be separated.

According to the preferred embodiments of the invention exemplified in the accompanying drawings, the feeding path (14) of the feeding assembly (5) is a substantially straight vertical feeding path (or feeding "rail"), and the clips (3) to be separated are allowed to travel freely along the path (14) of the feeding assembly (5) via the effect of gravity, although alternatively, the clips (3) to be separated could be urged forcefully along the path (14) of the feeding assembly (5) via a corresponding and suitable driving force, as can also be easily understood by a person skilled in the art.

According to a preferred embodiment of the present invention, the cross-sectional configuration of the feeding rail (14) of the feeding assembly (5) is complementary to that of a bottom portion of the clip (3) to be separated, and is thus preferably "T-shaped" (or at the very least "L-shaped"), as can be easily understood when referring to FIGS. 3, 7, 8, 12, 13, 15 and 21. It is worth mentioning however that other suitable geometrical configurations may used so as to properly receive, accumulate, align, guide and/or feed a plurality of clips (3) into the present clip separating system (1), as can be easily understood by a person skilled in the art.

Figure 24:
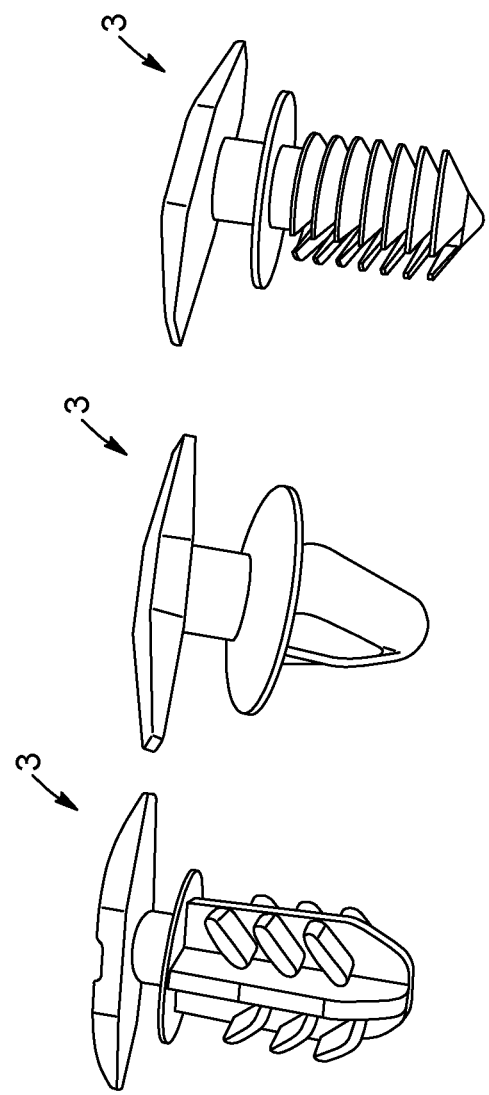
FIG. 24 shows perspective views of different examples of clips that may be used with the present clip separating system.
Figure 25:
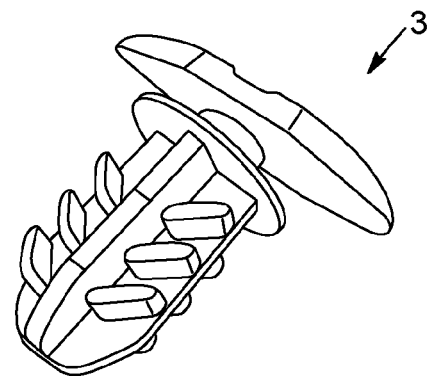
FIG. 25 is an enlarged perspective view of one of the clips shown in FIG. 24.
Figure 26:
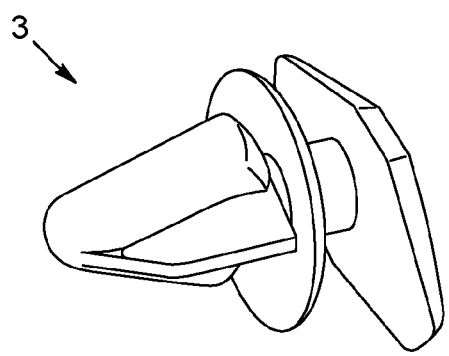
FIG. 26 is a perspective view of another one of the clips shown in FIG. 24.
Figure 27:
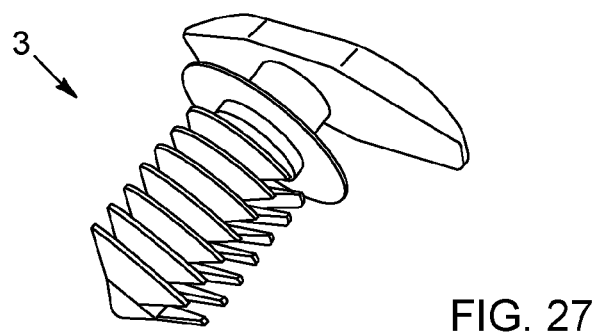
FIG. 27 is a perspective view of another one of the clips shown in FIG. 24.
Figure 28:
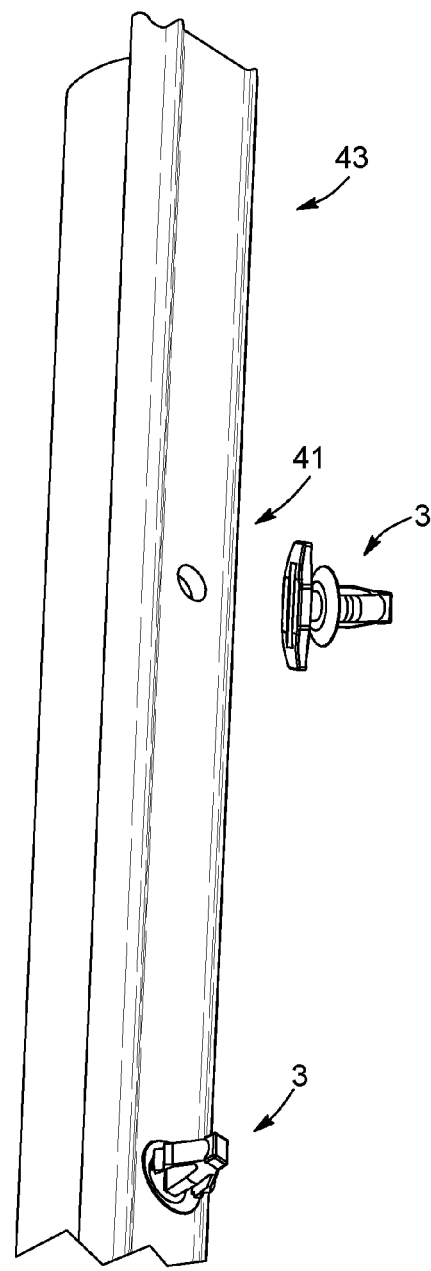
FIG. 28 is a partial view of a product band being provided with at least one clip mounted thereon, and being provided with a free aperture destined to receive another clip shown proximate thereto.
Figure 29:
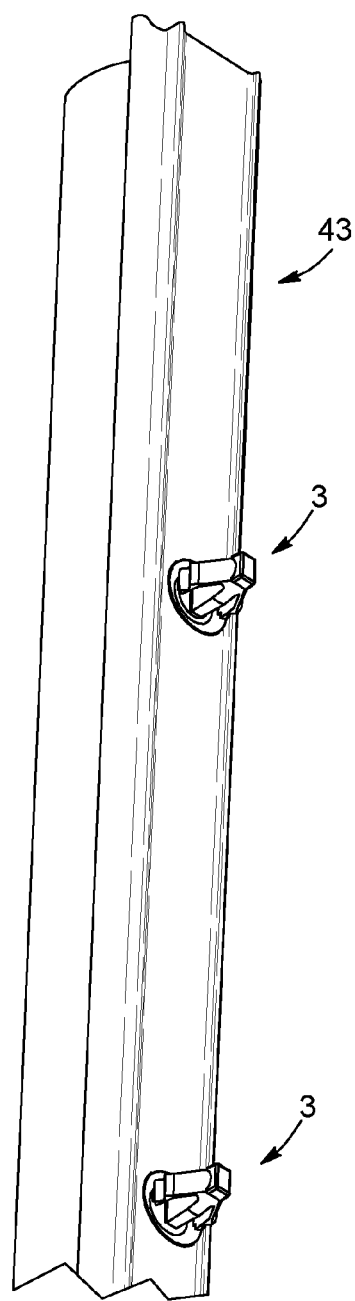
FIG. 29 is another partial perspective view of what is shown in FIG. 28, the product band being now shown with the proximate clip having been inserted into the aperture.
Figure 30:
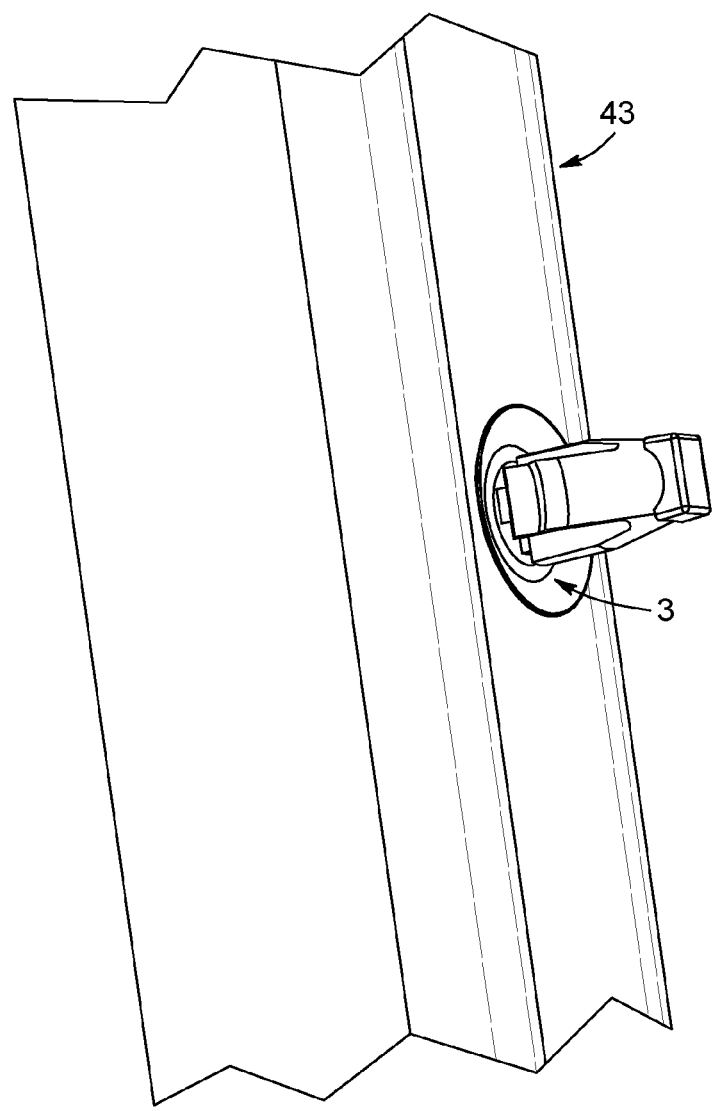
FIG. 30 is a partial enlarged view of a portion of what is shown in FIG. 29.

The present clip separating system (1) is also intended to be used with a plurality of different types of clips (3) or attachments. The clips (3) each preferably comprise components selected from the group consisting of at least one base, a neck and at least one wing, as can be easily understood when referring to FIGS. 24-30, and more particularly FIGS. 31-35. Namely, FIGS. 31-35 exemplify different components and features of a possible clip (3) that may be used according to the present invention. For example, the clip (3) may include: umbrella (3d), extraction point (3e), critical radius (31), umbrella height (3g), flash (3h), umbrella base (3i), neck (3j), neck height (3k), overall clip thickness (31), tip thickness (3m), grip height (3n), canoe height (3o), canoe width (3p), body thickness (3q), tip width (3r), wing width (3s), body width (3t), insertion point width (3u), recess length (3v), recess width (3w), canoe guide length (3x), injection point (3y) and parting line (3z). Preferably also, the orientation of each base of the clip (3) is substantially perpendicular to the orientation of a corresponding wing of the clip. Each base of the clip (3) comprises at least one retention surface, and preferably a pair of such retention surfaces, as better exemplified in FIGS. 24-35. Each clip (3) may be surface coated, and/or may be provided with a complementary sealing component, such as an O-ring provided around the neck of the clip (3), for example.

According to a preferred embodiment of the present invention, the path (10) and corresponding outlet (11) of the separating assembly (7) are configured so that the base (3c) of a separated clip (3) is orientated in a substantially vertical manner when maintained in place at the outlet (11) of the separating assembly (7) prior to being picked up by a complementary picking mechanism, as exemplified in FIGS. 11-15, for example.

Preferably, the neck of the clip (3) is substantially the same length as the thickness of the aperture (41) of the band (43) onto the clip (3) is to be mounted to ensure a substantially waterproof seal between the band (43) and the clip (3), when the latter is mounted onto its corresponding aperture (41). Indeed, the clip (3) is intended to provide a substantially waterproof joint, and may be used for various different components of a car, whether joints found in car doors, between the hood and a radiator, etc.

According to another aspect of the present invention, there is also provided a clip separating system (1) comprising both a feeding assembly (5) and a separating assembly (7). As can also be easily understood by a person skilled in the art when referring to FIGS. 1-23, the present clip separating system (1) may be used with a "single" feeding/separating assembly (5,7) or with a plurality thereof, such as a pair of first and second feeding assemblies (5) each being configured for dispensing a given clip (3) of a certain type (shape, size, color, etc.) or not (for example, both could be feeding two separate streams of clips (3) of the same nature for an increased total output, etc.), as well as with a pair of corresponding first and second separating assemblies (7), in which case the components and features of each assembly (feeding (5), separating (7), etc.) of the system (1) would be essentially the same as those described earlier, but with the noticeable exception that according to this particular embodiment, the outlet (11) of the separating assemblies (7) is "common" to both and is vertically offset with respect to the outlet (15) of each feeding assembly (5).

As can also be easily understood by a person skilled in the art, in view of the present description and the accompanying drawings, various other modifications and/or additions could be made to the clip separating system (1) without departing from the scope of the present invention. For example, and in order to obtain the same features and advantages which are intended by the present invention, it would be possible to modify the clip separating system (1) so as to: a) have cam-shaped movable components (25); b) have two or more different driving paths (10); c) etc.

Moreover, the clip separating system (1) may also advantageously comprise a vibration assembly (37) cooperating with clips (3) accumulated within a feeding path (14) of a given feeding assembly (5) for facilitating downward displacement of the clips (3) along the feeding path (14) of said given feeding assembly (5). Various different types of vibration assemblies (37) may be used with the present clip separating system (1), but for instance, for the one exemplified in FIGS. 1-3 and 9-10, and in the case where the clip separating system (1) comprises a pair of feeding assemblies (5), the vibration assembly (37) may simply comprise a pair of vertical flat bars, configured for operatively mounting onto the feeding assemblies (5) by means of corresponding support arms/links, said flat bars being vibrated by a corresponding vibratory cylinder so as to periodically (or cyclically, repeatedly, continuously, etc.) tap against the corresponding clips (3), and thus ensure an improved downward displacement along the feeding assemblies (5). Indeed, it may be appreciated that according to this particular embodiment of a possible vibration assembly (37), the principle lies on the fact of having a pair of blades or bars mounted onto directional coils or lamella ensuring the direction of movement. When oscillating, the flat bars push against the clips (3) and drive the same downwardly towards the separator. Among the various possible resulting advantages, this enables to prevent the clips (3) from undesirably mixing with one and other, ensuring a continuous flow of clips (3) towards the separator and creating a driving force which enables to overcome hesitations and friction forces which could be present. As previously explained, the oscillatory movement of the vibration assembly (37) can be driven by a pneumatic vibrator, or by any other suitable mechanism, such as an electromagnet, a pneumatic cylinder, or any other suitable assembly, as can be easily understood by a person skilled in the art.

According to yet another aspect of the present invention, there is also provided a kit with corresponding components for assembling a clip separating system (1) such as the one briefly described herein and such as the one exemplified in the accompanying drawings.

As may now be appreciated, the present invention is a substantial improvement over conventional clip separating systems known in the prior art in that, by virtue of its design and components, as briefly explained herein, the clip separating system (1) according to the present invention, enables to overcome several of the aforementioned prior art problems, providing for an easier, more precise, more effective, more reliable and more efficient system.

Namely, the clip separating system (1) according to the present invention enables the following advantages with respect to other conventional systems: a) use of a linear and vertical accumulation of clips (3) to ensure proper displacement of the clips (3) along the rail toward the separator, preferably via the effect of gravity; b) entry of the clip (3) into the separator is therefore done directly, thereby eliminating any possible friction due to a re-orientation of the clip (3) via a fixed and curved machined rail; c) a pivot point of the clip (3) to be separated is provided at the inlet (9) of the separating assembly (7); d) reorientation or pivoting of the clip (3) is done in a single step, and preferably along a spring-loaded arc-shaped path (10); e) controlled, fixed and stable geometry of the clip entry (9) of the separator ensures proper and precise entry of the clip (3) into the separator; f) clamping force of the spring-loaded path (10) of the separating assembly (7) is preferably intended to increase as the clip (3) is transferred from the inlet (9) to the outlet (11) of the separating assembly (7), which namely ensures an improved positioning and securement of the clip (3) at the separator outlet (11); g) the path (10) or rail of the separating assembly (7) is positioned, shaped and sized to properly maintain the clip (3) via the neck thereof, on each side of the clip (3), thereby preserving the integrity of the clip (3); h) the driving component (19) of the separating assembly (7), with its preferred pushing and supporting sub-components (19a, 19b), is configured for supporting the clip (3) underneath the same while pushing onto the neck portion of the clip (3), thereby further preserving the integrity of the clip (3) throughout the separating process, with the added benefit of acting on the clip (3) via its centre of gravity for even more improved handling and positioning thereof; i) increased repeatability of proper positioning of the clips (3) which enables for smaller tolerances around the clip (3) and thus a tighter and more improved control of clip (3) for an even more efficient clamping thereof, thereby allowing a greater force to be used for inserting the clip (3) into the rubber band (43), thereby increasing the stability of the overall installing process, thereby also enabling to process clips (3) or products that otherwise could not be normally used with conventional systems; etc.

As may also now be better appreciated, the present clip separating system (1) is also advantageous in that it enables to overcome different drawbacks and inconveniences associated with conventional systems, namely: a) the clip (3) to be separated is brought to the separator without any substantial risks; b) the clip (3) is brought to the separator via a vertical rail or path (14) enabling the accumulation of clips (3); c) the clip (3) uses gravity as a unique force of positioning in the separator, and thus, a single clip (3) is required for properly locating the clip (3) by itself into the entry (9) of the separator; d) a rotative mechanism (i.e. driving component (19)) pushes the clip (3) through a spring-loaded curved rail (10) to ensure the separation of one single clip (3) at a time, in that if a faulty clip (3) is improperly positioned into the path (10) or has not been picked up by the complementary pick up system, it will be flushed out by a subsequent clip (3) to be separated; e) the rotational operating principle enables an essential reorientation of the clip (3) so as to transfer the accumulated clips (3) in an axis where they can be used directly for the subsequent insertion step; f) the spring-loaded rail or path (10) is designed so as to facilitate the insertion of the clip (3) into the separator; g) the spring-loaded rail or path (10) is designed so as to offer a clamping force which increases progressively along the path (10) of the transfer of the clip (3) so as to ensure a very rapid movement of execution which is optimal (according to tests carried out by the Applicant, about 10 clips/second may be processed); h) the spring-loaded rail or path (10) enables to reduce the impact or adverse effects of imperfections of the plastic clips (3) during the displacement thereof through the different components of the present clip separating system (1); i) the spring-loaded rail or path (10) enables a very precise location and positioning of the clip (3) prior to the beginning of the clip insertion; j) if there is a second separation of clip (3) and there is already a clip (3) present in a separator, this latter clip will be automatically ejected by the arrival of a second or subsequent clip (3) because the rail or path (10) is "open-ended" at its distal extremity; k) the system (1) enables the provision of two different feeding assemblies (5) or hoppers to one common extraction or pick up point; l) the present system (1) does not require the presence of a shifting kit; m) the present system (1) increases the global cycle time of the machine when using two different feeding assemblies (5) or hoppers, in that there is no loss of time associated with the use of an auxiliary feeding hopper; n) the present system (1) facilitates and increases the adjustment speed of the machine tool at the level of transfer of the clip to the pick up tool to be used for subsequent insertion into the product; o) etc.

Although preferred embodiments of the present invention have been briefly described herein and illustrated in the accompanying drawings, it is to be understood that the invention is not limited to these embodiments and that various changes and modifications could be made without departing form the scope and spirit of the present invention, as defined in the appended claims.

The invention claimed is:

1. A clip separating system for separating a clip from an accumulation of clips contained within a feeding assembly, the clip separating system comprising:
a separating assembly having an inlet and an outlet, the inlet of the separating assembly being operatively connected to an outlet of the feeding assembly for receiving the clip to be separated therefrom, a path being defined between the inlet and the outlet of the separating assembly, the clip to be separated being positively driven along said path via a corresponding driving component of the clip separating system, the driving component being configured for pushing onto the clip to be separated along the path during a driving stroke of the driving component, the outlet of the separating assembly being offset with respect to the outlet of the feeding assembly, and the path and the outlet of the separating assembly being configured so that a base of a separated clip is oriented in a substantially vertical manner when maintained in place at the outlet of the separating assembly prior to being picked up by a complementary picking mechanism.

2. A clip separating system to claim 1, wherein the clip separating system includes a fixed component and a moveable component, the moveable component having a portion located under the outlet of the feeding assembly.

3. A clip separating system according to claim 2, wherein the moveable component is biased towards and end of the path.

4. A clip separating system according to claim 2, wherein the moveable component is spring-loaded towards and end of the path by a spring assembly.

5. A clip separating system according to claim 4, wherein the spring assembly comprises a preload being adjustable.

6. A clip separating system according to claim 2, wherein the moveable component is positioned, shaped and sized with respect to the fixed component so that a biasing force acting on the clip to be separated increases as the clip is displaced along the path from the inlet to the outlet of the separating assembly.

7. A clip separating system according to claim 2, wherein the moveable component is positioned, shaped and sized with respect to the fixed component so that the clip is deprived of any biasing force when entering the inlet of the separating assembly.

8. A clip separating system according to claim 2, wherein the separating assembly comprises a positioning abutment component for abutting against the moveable component to ensure a minimal distance between the moveable component and the fixed component of the separating assembly.

9. A clip separating system according to claim 8, wherein the positioning abutment component is configured to be selectively adjustable within the separating assembly to adjustably vary a default minimum distance of passage at the outlet of the separating assembly.

10. A clip separating system according to claim 1, wherein the path of the separating assembly is a substantially arched path.

11. A clip separating system according to claim 1, wherein the path of the separating assembly is about one quarter of a circle.

12. A clip separating system according to claim 1, wherein the driving component of the clip separating system comprises a supporting component for supporting a bottom section of the clip to be separated along the path during a driving stroke of the driving component.

13. A clip separating system according to claim 1, wherein the driving component is operatively activated by means of a driving cylinder.

14. A clip separating system according to claim 1, wherein the clip separating system comprises a transitional area operatively interconnecting the outlet of the feeding assembly to the inlet of the separating assembly.

15. A clip separating system according to claim 14, wherein the transitional area is positioned, shaped and sized for allowing no more than two clips to be accumulated in the transitional area when a clip to be separated is present in the inlet of the separating assembly.

16. A clip separating system according to claim 14, wherein the transitional area is positioned, shaped and sized with respect to a component of the driving component so that accumulated clips in the transitional area shift downwardly by about half of a position for each driving stroke of the driving component, and so that accumulated clips in the transitional area further shift downwardly by about half of a position for each retracting stroke of the driving component.

17. A clip separating system according to claim 1, wherein the clip separating system comprises a fingerstop intersecting the path of the separating assembly and being proximate to the inlet thereof, the fingerstop being positioned, shaped and sized for allowing the insertion of one clip to be separated at a time into the inlet of the separating assembly.

18. A clip separating system according to claim 17, wherein the fingerstop is rotatably mounted onto the clip separating system (1) and spring-loaded so as to allow passage of the clip through the fingerstop along a single direction corresponding to a driving stroke of the driving component of the clip separating system.

19. A clip separating system according to claim 1, wherein the clip separating system comprises a feeding assembly having an inlet and an outlet, a feeding path being defined between the inlet and the outlet of the feeding assembly, the feeding path being configured for accumulating a plurality of clips to be separated, the inlet of the feeding assembly being configured for receiving clips to be separated, and the outlet of the feeding assembly being configured for dispensing a clip to be separated towards the inlet of the separating assembly.

20. A clip separating system according to claim 19, wherein the clips to be separated are allowed to travel freely along the feeding path of the feeding assembly via the effect of gravity.

21. A clip separating system according to claim 19, wherein the clips to be separated are urged forcefully along the feeding path of the feeding assembly via a corresponding driving force.

22. A clip separating system according to claim 19, wherein the feeding path of the feeding assembly is a substantially straight vertical feeding path.

23. A clip separating system according to claim 19, wherein the cross-sectional configuration of the feeding path of the feeding assembly is complementary to that of a bottom portion of the clip to be separated.

24. A clip separating system according to claim 19, wherein the cross-sectional configuration of the feeding path of the feeding assembly comprises at least a substantially "L-shaped" portion.

25. A clip separating system according to claim 19, wherein the cross-sectional configuration of the feeding path of the feeding assembly is substantially "T-shaped".

26. A clip separating system according to claim 1, wherein the clip separating system comprises:
   first and second feeding assemblies each having an inlet and an outlet, the inlet of each feeding assembly being configured for receiving clips of a certain type to be separated, and the outlet of each feeding assembly being configured for dispensing a given clip of a certain type to be separated; and
   first and second separating assemblies each having an inlet and an outlet, the inlet of each separating assembly being operatively connected to the outlet of a corresponding feeding assembly for receiving the given clip of a certain type to be separated, a path being defined between the inlet and the outlet of each separating assembly, the given clip of a certain type to be separated being positively driven along a corresponding path via a corresponding driving component of the clip separating system, the outlet of the separating assemblies being common to both separating assemblies and being vertically offset with respect to the outlet of each feeding assembly.

27. A clip separating system according to claim 1, wherein the clip separating system comprises a vibration assembly cooperating with clips accumulated within a feeding path of a given feeding assembly for facilitating downward displacement of the clips along the feeding path of said given feeding assembly.

28. A kit with components for assembling a clip separating system according to claim 1.

29. A clip separating system according to claim 1, wherein the outlet of the separating assembly is open-ended to enable a flushing out of a given clip within the path by a subsequent clip to be separated.

* * * * *